US012614680B1

(12) United States Patent
Khan et al.

(10) Patent No.: US 12,614,680 B1
(45) Date of Patent: Apr. 28, 2026

(54) DYE-SENSITIZED SOLAR CELL BASED ON TITANIUM DIOXIDE, GRAPHITIC CARBON NITRIDE, AND CADMIUM SELENIDE NANOCOMPOSITE

(71) Applicant: King Fahd University of Petroleum and Minerals, Dhahran (SA)

(72) Inventors: Javed Alam Khan, Dhahran (SA); Muhammad Ashraf Gondal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/360,788

(22) Filed: Oct. 16, 2025

(51) Int. Cl.
　　*H01G 9/20* (2006.01)
　　*H01G 9/00* (2006.01)
(52) U.S. Cl.
　　CPC ......... *H01G 9/2054* (2013.01); *H01G 9/0036* (2013.01); *H01G 9/2031* (2013.01); *H01G 9/2059* (2013.01)
(58) Field of Classification Search
　　None
　　See application file for complete search history.

(56) References Cited

U.S. PATENT DOCUMENTS

2018/0182562　A1*　6/2018　Alghamdi ............ H01G 9/2059

FOREIGN PATENT DOCUMENTS

| CN | 110364361 A | 10/2019 |
| CN | 109261194 B | 5/2021 |
| KR | 10-2023-0132125 A | 9/2023 |

OTHER PUBLICATIONS

Yavuz et al., Journal of Alloys and Compounds, 936, 2023, 168209. (Year: 2023).*
Amini et al., Electrochimica Acta, 509, 2025, 145331. (Year: 2025).*
Fangmin Yan, et al., "Boosting the power conversion efficiency of quantum dot sensitized solar cells via g-C3N4 modified TiO2 nanoparticles", Superlattices and Microstructures, vol. 100, Sep. 29, 2016, pp. 392-400, Excerpts only, 5 pages.

(Continued)

*Primary Examiner* — Eli S Mekhlin
(74) *Attorney, Agent, or Firm* — Oblon, McClelland, Maier & Neustadt, L.L.P.

(57) ABSTRACT

A dye-sensitized solar cell (DSSC) includes a photoanode including a layer of a titanium dioxide, a graphitic carbon nitride, and a cadmium selenide ($TiO_2$/GCN/CdSe) nanocomposite, a layer of a light absorbing dye, and a transparent glass substrate on which the $TiO_2$/GCN/CdSe nanocomposite layer and the light absorbing dye layer are coated. The DSSC further includes a counter electrode including a layer of electrically conductive material and a transparent glass substrate, the electrically conductive material is coated on the transparent glass substrate, and an electrolyte between the photoanode and the counter electrode. The $TiO_2$/GCN/CdSe nanocomposite includes $TiO_2$ in an amount of 75 to 95 percent by weight (wt. %), GCN in an amount of 5 to 10 wt. %, and CdSe in an amount of 2 to 7 wt. %, based on the total weight of the $TiO_2$/GCN/CdSe nanocomposite.

19 Claims, 20 Drawing Sheets

(56)  References Cited

OTHER PUBLICATIONS

Wenhua Li, et al., "One-pot fabrication of mesoporous g-C3N4/NiS cocatalyst counter electrodes for quantum-dot-sensitized solar cells", Journal of Materials Science, vol. 55, Issue 24, Apr. 20, 2020, pp. 10712-10724.

Muhammad Shoaib, et al., "Dual S-Scheme Heterojunction CdS/Tio2/g-C3N4 Photocatalyst for Hydrogen Production and Dye Degradation Applications", ACS Omega 2023, vol. 8, Issue 45, Nov. 2, 2023, pp. 43139-43150.

* cited by examiner

DYE-SENSITIZED SOLAR CELL BASED ON TITANIUM DIOXIDE, GRAPHITIC CARBON NITRIDE, AND CADMIUM SELENIDE NANOCOMPOSITE

STATEMENT OF PRIOR DISCLOSURE BY AN INVENTOR

Aspects of the present disclosure are described in Khan, J. A.; Gondal, M. A.; Ahmed, S. (2025) "Synergistic effect of pulsed laser synthesized ternary TiO$_2$/graphitic carbon nitride/CdSe nanocomposite photoanode for high-performance N719 dye co-sensitized solar cells." *Inorganic Chemistry Communications,* 179, Part 1, 114717, which is incorporated herein by reference in its entirety.

STATEMENT OF ACKNOWLEDGEMENT

Support provided by the Physics Department at King Fahd University of Petroleum and Minerals, Saudi Arabia is gratefully acknowledged.

BACKGROUND

Technical Field

The present disclosure is directed to a dye-sensitized solar cell (DSSC), more particularly, the DSSC based on titanium dioxide, graphitic carbon nitride, and cadmium selenide (TiO$_2$/GCN/CdSe) nanocomposite, and a layer of a light absorbing dye coated on a transparent glass substrate.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Renewable energy sources such as biomass, wind, hydro, tidal, and solar power have been extensively investigated to meet the growing global energy demand in a sustainable way. Among these, solar energy has proven especially promising because of its abundance and reliability. Within solar technologies, third-generation dye-sensitized solar cells (DSSCs) have attracted great interest due to their low cost, ease of fabrication, semi-flexibility, and semi-transparency, which make them suitable for applications like portable devices and building-integrated photovoltaics.

A DSSC is a photoelectrochemical device that mimics photosynthesis to convert sunlight into electricity. Its architecture generally consists of a transparent conducting oxide substrate, a mesoporous semiconductor such as TiO$_2$, ZnO, or SnO$_2$, a dye sensitizer, a redox electrolyte, and a counter electrode (platinum, carbon, or conducting polymers) [D. Joshy, S. B. Narendranath, Y. A. Ismail, P. Periyat, Recent progress in one dimensional TiO$_2$ nanomaterials as photoanodes in dye-sensitized solar cells, Nanoscale Adv. 4 (2022) 5202-5232; and M. Younas, M. A. Gondal, Economical and efficient dye sensitized solar cells using single wall carbon nanotube-titanium dioxide nanocomposites as photoanode and SWCNT as Pt-free counter electrode, Sol. Energy. 245 (2022) 37-45]. When illuminated, the dye injects electrons into the conduction band of the DSSC, which flow through the external circuit to generate power, while the electrolyte regenerates the oxidized dye to complete the cycle.

Despite their advantages, DSSCs face limitations such as lower efficiency compared to silicon solar cells, electron recombination, and stability issues caused by volatile liquid electrolytes. To overcome these challenges, the present disclosure focusses on solid-state and quasi-solid electrolytes, broader-spectrum dyes, nanostructured semiconductors, and sustainable electrode materials.

Accordingly, it is one object of the present disclosure to provide a DSSC based on a ternary nanocomposite that combines three functional materials to synergistically enhance performance of the solar cell. The ternary nanocomposite improves electron transport, provides a higher surface area for dye loading, and boosts light harvesting through plasmonic or conductive effects.

SUMMARY

In an exemplary embodiment, a dye-sensitized solar cell (DSSC) is described. The DSSC includes a photoanode including a layer of a titanium dioxide, a graphitic carbon nitride, and a cadmium selenide (TiO$_2$/GCN/CdSe) nanocomposite, a layer of a light absorbing dye, and a transparent glass substrate on which the TiO$_2$/GCN/CdSe nanocomposite layer and the light absorbing dye layer are coated. The DSSC further includes a counter electrode including a layer of electrically conductive material and a transparent glass substrate, the electrically conductive material is coated on the transparent glass substrate, and an electrolyte between the photoanode and the counter electrode. The TiO$_2$/GCN/CdSe nanocomposite includes TiO$_2$ in an amount of 75 to 95 percent by weight (wt. %), GCN in an amount of 5 to 10 wt. %, and CdSe in an amount of 2 to 7 wt. %, based on the total weight of the TiO$_2$/GCN/CdSe nanocomposite.

In some embodiments, the light absorbing dye has an absorbance maximum at a wavelength of 200 to 1000 nm.

In some embodiments, the light absorbing dye is selected from the group consisting of N3, N719, coumarin, a porphyrin, an indoline dye, chlorophyll, anthocyanin, betalain, a carotenoid, a tannin, and an aurone.

In some embodiments, electrically conductive material on the counter electrode is selected from the group consisting of platinum, gold, silver, graphite, iridium oxide, and ruthenium oxide.

In some embodiments, the electrolyte is an iodide/triiodide-based electrolyte.

In some embodiments, the electrolyte is either a solution-state electrolyte or a solid-state electrolyte.

In some embodiments, the TiO$_2$/GCN/CdSe nanocomposite is in the form of particles, having a polycrystalline structure.

In some embodiments, the TiO$_2$/GCN/CdSe nanocomposite has a band gap of 2.3 to 2.8 eV.

In some embodiments, the photoanode has a conversion efficiency of 7 to 9%.

In some embodiments, the photoanode has a short circuit current density ($J_{SC}$) of 15 to 25 milliamperes per centimeter square (mA/cm$^2$).

In some embodiments, the photoanode has a filter factor (FF) of 50 to 60%.

In some embodiments, the photoanode has an open circuit voltage ($V_{OC}$) of 0.5 to 0.8 V.

In some embodiments, the photoanode has a charge transfer resistance ($R_{ct}$) of 12 to 17Ω.

In another exemplary embodiment, the $TiO_2$/GCN/CdSe nanocomposite is obtained by mixing $TiO_2$, GCN, and CdSe in a solvent to generate a solution and exposing the solution to a concentrated laser beam to obtain the $TiO_2$/GCN/CdSe nanocomposite.

In some embodiments, the mixing has a $TiO_2$:GCN:CdSe weight ratio of 0.8 to 1.2:0.05 to 0.2:0.01 to 0.1.

In some embodiments, the solvent is selected from the group consisting of water, dimethyl formamide, dimethyl sulfoxide, methanol, ethanol, propanol, isopropanol, and butanol.

In some embodiments, the concentrated laser beam has a wavelength of 500 to 600 nm, a pulse energy of 35 to 45 milli joules per centimeter square (mJ cm$^{-2}$), a pulse width of 1 to 10 ns, and repeat rate of 5 to 15 Hz.

In yet another exemplary embodiment, the photoanode is produced by applying Ti-Nanoxide blocking layer (BL)/ screen printed (SP) to a glass substrate to generate a $TiO_2$ layer, mixing the $TiO_2$/GCN/CdSe nanocomposite with α-terpinol, ethanol, and ethyl cellulose to form a gel. The method further includes spreading the gel on the $TiO_2$ layer to obtain an anode, and finally, submerging the anode in a dye solution to obtain the photoanode.

In some embodiments, the anode is heated twice after spreading, and a first heating is to a temperature of 150 to 250° C., and a second heating is to a temperature of 450 to 600° C.

In some embodiments, the submerging lasts for a period of 18 to 48 hours.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figures 1A, 1B:
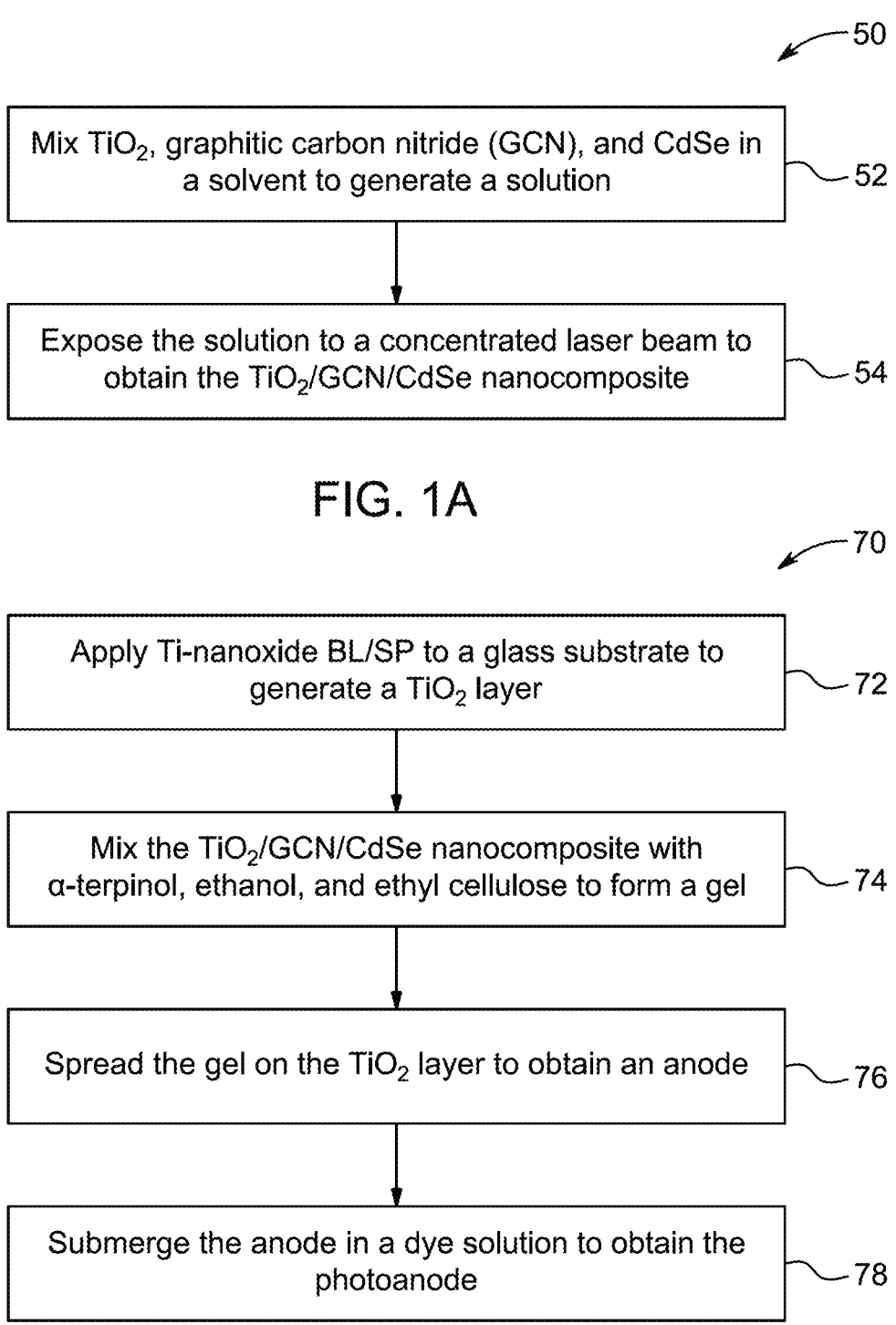
FIG. 1A is an exemplary flowchart for synthesizing a titanium dioxide ($TiO_2$)/graphitic carbon nitride (GCN)/ cadmium selenide (CdSe) nanocomposite, according to certain embodiments.
FIG. 1B is an exemplary flowchart of preparation of a photoanode of a dye sensitized solar cell (DSSC), according to certain embodiments.

When describing the present disclosure, the terms used are to be construed in accordance with the following definitions, unless a context dictates otherwise.

Embodiments of the present invention will now be described more fully hereinafter with reference to the accompanying drawings, wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)±3° C. in the present disclosure.

As used herein, the term 'nanocomposite' refers to a composite material that has at least one component with a grain size measured in nm.

As used herein, the term 'photoanode' refers to a light-harvesting electrode, usually made of a transparent conducting substrate coated with a porous semiconductor like $TiO_2$. It adsorbs dye molecules, collects excited electrons, and transports them to the external circuit, playing a key role in solar energy conversion.

As used herein, the term 'counter electrode' in a photo-electrochemical cell is the conductive electrode that completes the circuit by facilitating the redox reaction of the electrolyte. Its main role is to collect electrons from the external circuit and catalyze the reduction (or oxidation) of redox species, ensuring charge balance and continuous operation of the cell.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a dye-sensitized solar cell (DSSC) based on a ternary nanocomposite, dye, and counter electrode. The synergistic effect of the ternary nanocomposite enhances visible light absorption and increases electron transport, inhibiting charge recombination and improving device performance. At the counter electrode, the ternary nanocomposite also offers better catalytic activity and stability, often serving as cost-effective alternatives to platinum.

According to a first aspect of the present disclosure, the DSSC is described. The DSSC includes a photoanode including a layer of a titanium dioxide, graphitic carbon nitride, and cadmium selenide ($TiO_2$/GCN/CdSe) nanocomposite, a layer of a light absorbing dye, and a transparent glass substrate on which the $TiO_2$/GCN/CdSe nanocomposite layer and the light absorbing dye layer are coated.

In some embodiments, the $TiO_2$/GCN/CdSe nanocomposite includes the $TiO_2$ in an amount of 75 to 95 wt. %, preferably 76 to 94 wt. %, preferably 77 to 93 wt. %, preferably 78 to 92 wt. %, preferably 79 to 91 wt. %, preferably 80 to 90 wt. %, preferably 81 to 89 wt. %, preferably 82 to 88 wt. %, and preferably 83 to 87 wt. % based on the total weight of the $TiO_2$/GCN/CdSe nanocomposite. In a preferred embodiment, the $TiO_2$/GCN/CdSe nanocomposite includes the $TiO_2$ in an amount of 86 wt. % based on the total weight of the $TiO_2$/GCN/CdSe nanocomposite.

In some embodiments, the $TiO_2$/GCN/CdSe nanocomposite includes the GCN in an amount of 5.0 to 10.0 wt. %, preferably 5.2 to 9.8 wt. %, preferably 5.4 to 9.6 wt. %, preferably 5.6 to 9.4 wt. %, preferably 5.8 to 9.2 wt. %, preferably 6.0 to 9.0 wt. %, and preferably 6.2 to 8.8 wt. % based on the total weight of the $TiO_2$/GCN/CdSe nanocomposite. In a preferred embodiment, the $TiO_2$/GCN/CdSe nanocomposite includes the GCN in an amount of 8.6 wt. % based on the total weight of the $TiO_2$/GCN/CdSe nanocomposite.

In some embodiments, the $TiO_2$/GCN/CdSe nanocomposite includes the CdSe in an amount of 2.0 to 7.0 wt. %, preferably 2.2 to 6.8 wt. %, preferably 2.4 to 6.6 wt. %, preferably 2.6 to 6.4 wt. %, preferably 2.8 to 6.2 wt. %, preferably 3.0 to 6.0 wt. %, preferably 3.2 to 5.8 wt. %, preferably 3.4 to 5.6 wt. %, preferably 3.6 to 5.4 wt. %, preferably 3.8 to 5.2 wt. %, preferably 4.0 to 5.0 wt. %, preferably 4.2 to 4.8 wt. % based on the total weight of the $TiO_2$/GCN/CdSe nanocomposite. In a preferred embodiment, the $TiO_2$/GCN/CdSe nanocomposite includes the CdSe in an amount of 4.3 wt. % based on the total weight of the $TiO_2$/GCN/CdSe nanocomposite.

In some embodiments, the transparent glass substrate is at least one selected from the group consisting of a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, or a nickel oxide coated glass substrate is used. In a preferred embodiment, the transparent glass substrate used is fluorine-doped tin oxide (FTO).

In some embodiments, the light absorbing dye is selected from the group consisting of N3, N719, coumarin, a porphyrin, an indoline dye, chlorophyll, anthocyanin, betalain, a carotenoid, a tannin, and an aurone. In a preferred embodiment, the light absorbing dye is N719 dye.

In some embodiments, the light absorbing dye has an absorbance maximum at a wavelength of 200 to 1000 nm, preferably 220 to 980 nm, preferably 240 to 960 nm, preferably 260 to 940 nm, preferably 280 to 920 nm, preferably 300 to 900 nm, preferably 320 to 880 nm, preferably 340 to 860 nm, preferably 360 to 840 nm, and preferably 380 to 820 nm. In a preferred embodiment, N719 dye has an absorbance maximum at a wavelength between approximately 385 nm and approximately 524 nm.

In some embodiments, a counter electrode includes a layer of electrically conductive material and a transparent glass substrate. The electrically conductive material is coated on the transparent glass substrate, and an electrolyte is placed between the photoanode and the counter electrode.

In some embodiments, electrically conductive material on the counter electrode is selected from the group consisting of platinum, gold, silver, graphite, iridium oxide, and ruthenium oxide. In a preferred embodiment, electrically conductive material on the counter electrode is platinum.

In some embodiments, the electrolyte is either a solution-state electrolyte or a solid-state electrolyte. As used herein, the 'solution-state electrolyte' in solar cells refers to a liquid redox couple dissolved in a suitable solvent that transports charge between the photoanode and the counter electrode. It regenerates the oxidized dye after electron injection and completes the electrical circuit. Suitable examples include iodide/triiodide ($I^-/I_3^-$), cobalt complexes, ferrocene/ferrocenium systems, and sulfur-based ($S^{2-}/S_x^{2-}$) redox couples.

As used herein, the 'solution-state electrolyte' in solar cells refers to a solid material that replaces the liquid redox couple, transporting charges between the photoanode and counter electrode. It improves device stability by avoiding leakage and evaporation issues of liquid electrolytes. Suitable examples include spiro-OMeTAD, CuI, CuSCN, P3HT, and PEDOT. In a preferred embodiment, the electrolyte is an iodide/triiodide-based electrolyte.

In some embodiments, the $TiO_2$/GCN/CdSe nanocomposite is in the form of particles, having a polycrystalline structure. In some embodiments, the $TiO_2$ has an anatase (tetragonal) crystal structure. In some embodiments, the $TiO_2$ may exist in rutile (tetragonal) or Brookite (orthorhombic) crystal structures. In some embodiments, the CdSe may exist in a hexagonal and a cubic crystal structure.

In some embodiments, the $TiO_2$/GCN/CdSe nanocomposite has a band gap of 2.30 to 2.80 eV, preferably 2.35 to 2.75 eV, preferably 2.40 to 2.70 eV, preferably 2.45 to 2.65 eV, and preferably 2.50 to 2.60 eV. In a preferred embodiment, the $TiO_2$/GCN/CdSe nanocomposite has the band gap of 2.56 eV.

In some embodiments, the photoanode has a conversion efficiency of 7.0 to 9.0%, preferably 7.1 to 8.9%, preferably 7.2 to 8.8%, preferably 7.3 to 8.7%, preferably 7.4 to 8.6%, preferably 7.5 to 8.5%, preferably 7.6 to 8.4%, preferably 7.7 to 8.3%, preferably 7.8 to 8.2%, and preferably 7.9 to 8.1%. In a preferred embodiment, the photoanode has a conversion efficiency of 8.04%.

In some embodiments, the photoanode has a short circuit current density ($J_{SC}$) of 15 to 25 mA/cm², preferably 16 to 24 mA/cm², preferably 17 to 23 mA/cm², preferably 18 to 22 mA/cm², and preferably 19 to 21 mA/cm². In a preferred embodiment, the photoanode has a $J_{SC}$ of 20.56 mA/cm².

In some embodiments, the photoanode has a filter factor (FF) of 50 to 60%, preferably 51.5 to 59.5%, preferably 51 to 59%, preferably 51.5 to 58.5%, preferably 52 to 58%, preferably 52.5 to 57.5%, and preferably 53 to 57%. In a preferred embodiment, the photoanode has the FF of 56.70%.

In some embodiments, the photoanode has an open circuit voltage ($V_{OC}$) of 0.50 to 0.80 V, preferably 0.52 to 0.78 V, preferably 0.54 to 0.76 V, preferably 0.56 to 0.74 V, preferably 0.58 to 0.72 V, and preferably 0.60 to 0.70 V. In a preferred embodiment, the photoanode has a $V_{OC}$ of 0.69.

In some embodiments, the photoanode has a charge transfer resistance ($R_{ct}$) of 12.0 to 17.0Ω, preferably 12.2 to 16.8Ω, preferably 12.4 to 16.6Ω, preferably 12.6 to 16.4Ω, preferably 12.8 to 16.2Ω, preferably 13.0 to 16.0Ω, preferably 13.2 to 15.8Ω, preferably 13.4 to 15.6Ω, preferably 13.6 to 15.4Ω, preferably 13.8 to 15.2Ω, and preferably 14.0 to 15.0Ω. In a preferred embodiment, the photoanode has a $R_{ct}$ of 14.97Ω.

FIG. 1A illustrates a flow chart of a method 50 for preparing the $TiO_2$/GCN/CdSe nanocomposite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing $TiO_2$, GCN, and CdSe in a solvent to generate a solution. In some embodiments, the mixing has a $TiO_2$:GCN:CdSe weight ratio of 0.8 to 1.2:0.05 to 0.2:0.01 to 0.1, preferably 0.85 to 1.15:0.06 to 0.19:0.02 to 0.09, preferably 0.90 to 1.10:0.07 to 0.18:0.03 to 0.08, and preferably 0.95 to 1.05:0.08 to 0.17:0.04 to 0.07. In a preferred embodiment, the mixing has a $TiO_2$:GCN:CdSe weight ratio of 1:0.1:0.05.

In some embodiments, the solvent is selected from the group consisting of water, dimethyl formamide, dimethyl sulfoxide, methanol, ethanol, propanol, isopropanol, and butanol. In a preferred embodiment, the solvent used is water. In some embodiments, the water may be tap water, distilled water, bi-distilled water, deionized water, deionized distilled water, reverse osmosis water, hard water, fresh water, brine/salt water, the hard water, and the freshwater may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In a preferred embodiment, the water is distilled water.

At step 54, the method 50 includes exposing the solution to a concentrated laser beam to obtain the $TiO_2$/GCN/CdSe nanocomposite. In some embodiments, the concentrated laser beam has a wavelength of 500 to 600 nm, preferably 505 to 585 nm, preferably 510 to 580 nm, preferably 515 to 575 nm, preferably 520 to 580 nm, preferably 525 to 575 nm, and preferably 530 to 570 nm. In a preferred embodiment, the concentrated laser beam has a wavelength of 532 nm.

In some embodiments, the concentrated laser beam has a pulse energy of 35 to 45 milli joules per centimeter square ($mJ\ cm^{-2}$), preferably 36 to 44 $mJ\ cm^{-2}$, preferably 37 to 43 $mJ\ cm^{-2}$, preferably 38 to 42 $mJ\ cm^{-2}$, and preferably 39 to 41 $mJ\ cm^{-2}$. In a preferred embodiment, the concentrated laser beam has a pulse energy of 40 $mJ\ cm^{-2}$.

In some embodiments, the concentrated laser beam has a pulse width of 1 to 10 nanoseconds (ns), preferably 2 to 9 ns, preferably 3 to 8 ns, and preferably 4 to 7 ns. In a preferred embodiment, the concentrated laser beam has a pulse width of 5 ns.

In some embodiments, the concentrated laser beam has a repeat rate of 5 to 15 Hz, preferably 6 to 14 Hz, preferably 7 to 13 Hz, preferably 8 to 12 Hz, and preferably 9 to 11 Hz. In a preferred embodiment, the concentrated laser beam has a repeat rate of 10 Hz.

FIG. 1B illustrates a flow chart of a method 70 for making the photoanode. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes applying the $TiO_2$ blocking layer (BL)/screen printed (SP) to a glass substrate to generate a $TiO_2$ layer. In some embodiments, Ti-nanoxide BL/SP is applied to a glass substrate using one of the techniques, like the drop-casting method, spray coating, spin coating, and dip coating. In a preferred embodiment, Ti-nanoxide BL/SP to the glass substrate using spin coating technique. In some embodiments, the heating after spin coating to form the $TiO_2$ layer at 400 to 600° C., preferably 420 to 580° C., preferably 440 to 560° C., preferably 460 to 540° C., and preferably 480 to 520° C.

At step 74, the method 70 includes mixing the $TiO_2$/CdSe nanocomposite with α-terpinol, ethanol, and ethyl cellulose to form a gel. In some embodiments, the mixing may be done by stirring, swirling, sonicating, or a combination thereof.

At step 56, the method 50 includes spreading the gel on the $TiO_2$ layer to obtain an anode. In some embodiments, the gel is applied to an active region of 0.25 to 1 $cm^2$, preferably 0.25 to 0.75 $cm^2$, preferably 0.25 to 0.50 $cm^2$, and more preferably 0.25 $cm^2$ of $TiO_2$ BL coated on the glass substrate. In some embodiments, the gel is applied to $TiO_2$ BL coated on the glass substrate by doctor blading approach. In some embodiments, the gel may be applied to $TiO_2$ BL coated on the glass substrate by using spin coating, dip coating, slot-die coating, spray coating, bar coating, screen printing, inkjet printing, or roll-to-roll coating.

At step 58, the method 50 includes submerging the anode in a dye solution to obtain the photoanode. In some embodiments, the concentration of the dye solution is 0.1 mM to 1 mM, preferably 0.2 to 0.9 mM, preferably 0.3 to 0.8 mM, and preferably 0.4 to 0.7 mM. In a preferred embodiment, the concentration of the dye solution is 0.5 mM.

In some embodiments, the submerging lasts for a period of 18 to 48 hours, preferably 19 to 47 hours, preferably 20 to 46 hours, preferably 21 to 45 hours, preferably 22 to 44 hours, and preferably 23 to 43 hours. In a preferred embodiment, the submerging lasts for a period of 24 hours.

In some embodiments, the anode is heated twice after spreading, and a first heating is to a temperature of 150 to 250° C., preferably 160 to 240° C., preferably 170 to 230° C., preferably 180 to 220° C., and preferably 190 to 210° C. for 8 to 12 minutes, preferably 9 to 11 minutes. In a preferred embodiment, the anode is heated twice after spreading, and the first heating is to a temperature of 200° C. for 10 minutes.

In some embodiments, a second heating is to a temperature of 450 to 600° C., preferably 460 to 590° C., preferably 470 to 580° C., preferably 480 to 570° C., and preferably 490 to 560° C. for 18 to 22 minutes, preferably 19 to 21 minutes. In a preferred embodiment, the second heating is to a temperature of 500° C. for 20 minutes.

EXAMPLES

The following examples demonstrate the fabrication of a dye-sensitized solar cell (DSSC) using titanium oxide/graphitic carbon nitride/cadmium selenide ($TiO_2$/GCN/CdSe) nanocomposite (also referred to as a ternary nanocomposite (t-NCs)) as a photoanode. The examples are provided solely for illustration and are not to be construed as limitations of the present disclosure, as many variations thereof are possible without departing from the spirit and scope of the present disclosure.

Example 1: Materials

Melamine powder ($C_3H_6N_6$, 99%), titanium (IV) isopropoxide ($C_{12}H_{28}O_4Ti$; 98%), cadmium selenide powder (CdSe), ethanol ($C_2H_5OH$), α-terpineol ($C_{10}H_{18}O$, 90%), ethylcellulose, and isopropyl alcohol were purchased from Thermo Fisher Scientific, Waltham, MA, USA. Moreover, FTO-coated glass substrates (7 Ω/sq.), N719 Ruthenium dye, Ti nanooxide (BL/SP), iodolyte (Z-50), and platisol (T/SP) paste were bought from Solaronix company, Switzerland. The iodolyte Z-50 electrolyte contains a mixture of 50 mM iodide/triiodide redox, coupled in 3-methoxypropionitrile. All materials were used as received without further purifications and modifications.

Example 2: Synthesis of $TiO_2$/GCN/CdSe Nanocomposite

An appropriate amount of titanium isopropoxide was vigorously stirred into a beaker containing a mixed solution of ethanol and citric acid, and it was kept stirring for 3 hours at 80° C. Then, the pH value was adjusted to 6-7 with the help of ammonia solution and kept it stirring till the formation of a gel-like structure due to the continuous stirring and heating. Subsequently, it was heated for 30 min at 150° C. and then at 300° C. to auto-ignite the sample under an ambient atmosphere. Then, the combusted powder was ground in a mortar pestle and transferred to a furnace for further calcination for 2 hours at 500° C. in the ambient atmosphere.

The GCN was synthesized and calcined using melamine powder under ambient conditions. Further, thermal pyrolysis method was followed to heat 5 g of melamine powder at 550° C. and then calcined it in a muffle furnace for 3 hours with a heating rate of 5° C./minute, resulting in the formation of tri-s-triazine units. These tri-s-triazine units then aggregated due to the calcination to produce larger and thicker sheets of GCN.

Figure 2:
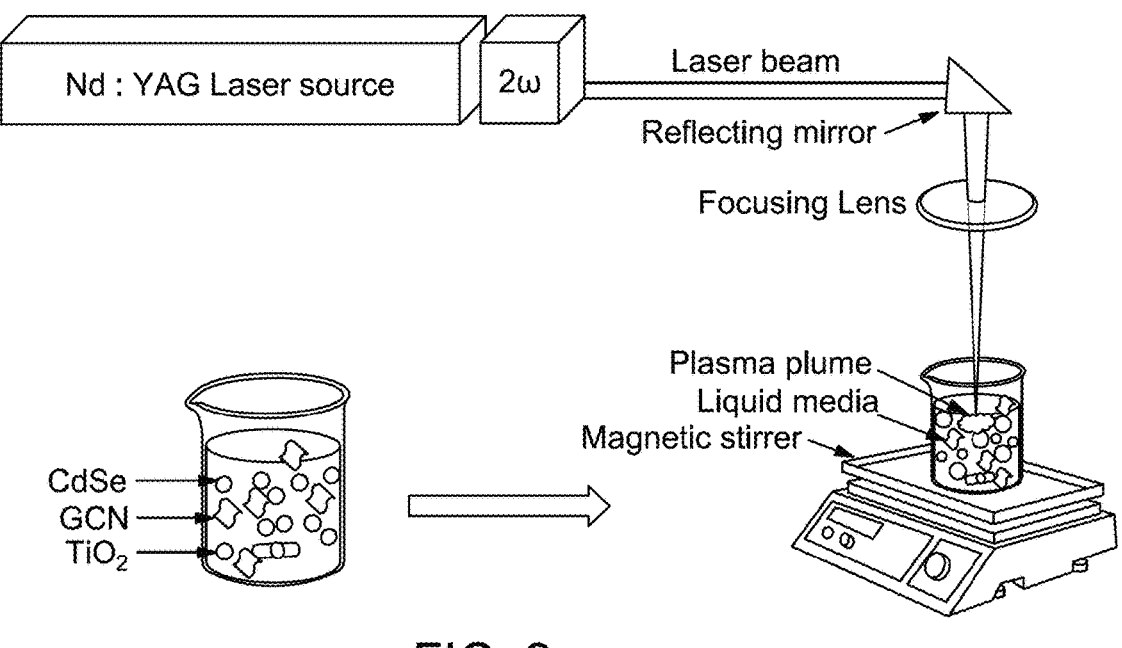
FIG. 2 shows a schematic illustration of pulsed laser ablation-assisted synthesis of the $TiO_2$/GCN/CdSe nanocomposite, according to certain embodiments.

The pulsed laser ablation in liquids (PLAL) approach was used to prepare the TiO$_2$/GCN binary nanocomposite (b-NCs) and TiO$_2$/GCN/CdSe ternary nanocomposite (t-NCs) in an ambient atmosphere, as illustrated in FIG. 2. TiO$_2$ NPs and GCN were taken in a mass ratio of 1:0.1 and mixed in 20 mL of deionized (DI) water to synthesize the b-NCs. Meanwhile, for making t-NCs, the weight ratio of TiO$_2$ NPs, GCN, and CdSe was taken at 1:0.1:0.05 and mixed in 20 mL of distilled water. These solutions were ultrasonicated for 10 minutes and kept underneath the laser separately to synthesize b-NCs and t-NCs. The solutions were exposed to the concentrated laser beam of a nanosecond pulsed Nd:YAG laser (Brilliant B) with a wavelength of 532 nm, pulse energy of 40 mJ cm$^{-2}$, pulse width 5 ns, and repeat rate of 10 Hz for 30 minutes. A magnetic stirrer at 500 rotations per minute (rpm) was used to agitate the solution at room temperature and provide uniform irradiation while it was exposed to the laser. The pulsed laser beam produces the plasma plume through the interaction of the particles, resulting in a change in the plasma plume over time. Subsequently, cavitation bubbles are formed in the liquid media and burst after a few milliseconds to create an ultrasonic shock wave, further breaking the particle into synthesized nanocomposites.

Example 3: Device Fabrication

The 2.5 cm$^2$ fluorine-doped tin oxide (FTO) glass substrates were ultrasonically cleaned with soap solution, distilled water (DI water), ethanol, acetone, and isopropyl alcohol sequentially. Then, cleaned substrates were transferred to a plasma asher for surface cleaning for 10 minutes. Ti-nanoxide BL/SP was initially applied to the cleaned FTO via spin coating and heated at 500° C. for 30 minutes to form a compact layer of TiO$_2$. The synthesized TiO$_2$ NPs, b-NCs, and t-NCs were converted into gels utilizing α-terpinol, ethanol, and ethyl cellulose and subsequently applied separately to the active region of approximately 0.25 cm$^2$ of blocking layer coated TiO$_2$ on FTO substrates using the doctor blading approach. To enhance consistency, samples were heated twice, initially at 200° C. for 10 minutes, followed by 500° C. for 20 minutes. The samples were submerged in a 0.5 mM N719 dye solution in 20 mL of ethanol for 24 hours. Conversely, a counter electrode was fabricated using cleaning procedures identical to the FTO. The Pt solution was coated onto the FTO and annealed for 10 min at 450° C. In the final step, Iodolyte Z-50 electrolyte was added between the two FTO electrodes, shortly thereafter, the photoanode and counter electrode were sandwiched with clips and sealed with surlyn film.

Example 4: Characterizations

The patterns of X-ray diffraction (XRD) were obtained by scanning at a rate of 1° per minute over a 2θ scan range from 10 to 80°. The XRD was manufactured by Mini Flex Rigaku Company from the USA, which was operated at 40 kV and employed Cu-Kα radiation with a wavelength of 1.54 Å to obtain the XRD pattern of the synthesized materials. Scanning elSEM equipped with EDS (JEOL, JSM-6610) was utilized for morphological analysis at an operating voltage of 20 kV. Furthermore, a field emission gun-transmission electron microscope (FEG-TEM) analysis and selected area electron diffraction (SAED) were conducted using a JEOL JEM2100F instrument from Japan, operated at 80 kV. A Thermo Scientific X-ray photoelectron spectrometer (XPS) setup with monochromatic Al-Kα radiation was employed to study the chemical composition and states in the synthesized materials. The absorption spectrum and charge recombination were analyzed utilizing a UV-vis diffused reflectance absorption spectrophotometer (DRS) and spectrofluorometer (JASCO, USA), employing 320-800 nm for absorption and 425 nm for excitation. The Fourier-transformed infrared (FTIR) spectrometer with a resolution of 4 cm$^{-1}$ from the Perkin Elmer company was utilized. Moreover, the current-voltage (I-V) curve was assessed using a solar simulator with one sun (1000 W/m$^2$ illumination) and an AM 1.5G filter, with an attached Keithley source meter (model 2400). For electrochemical impedance spectroscopy (EIS) measurements, a potentiostat/galvanostat (Corrtest, CS350M) was utilized to apply an AC amplitude of 10 millivolts (mV), and the data were obtained throughout the frequency range of 0.1 Hz to 105 Hz.

Results and Discussion

Figure 3:
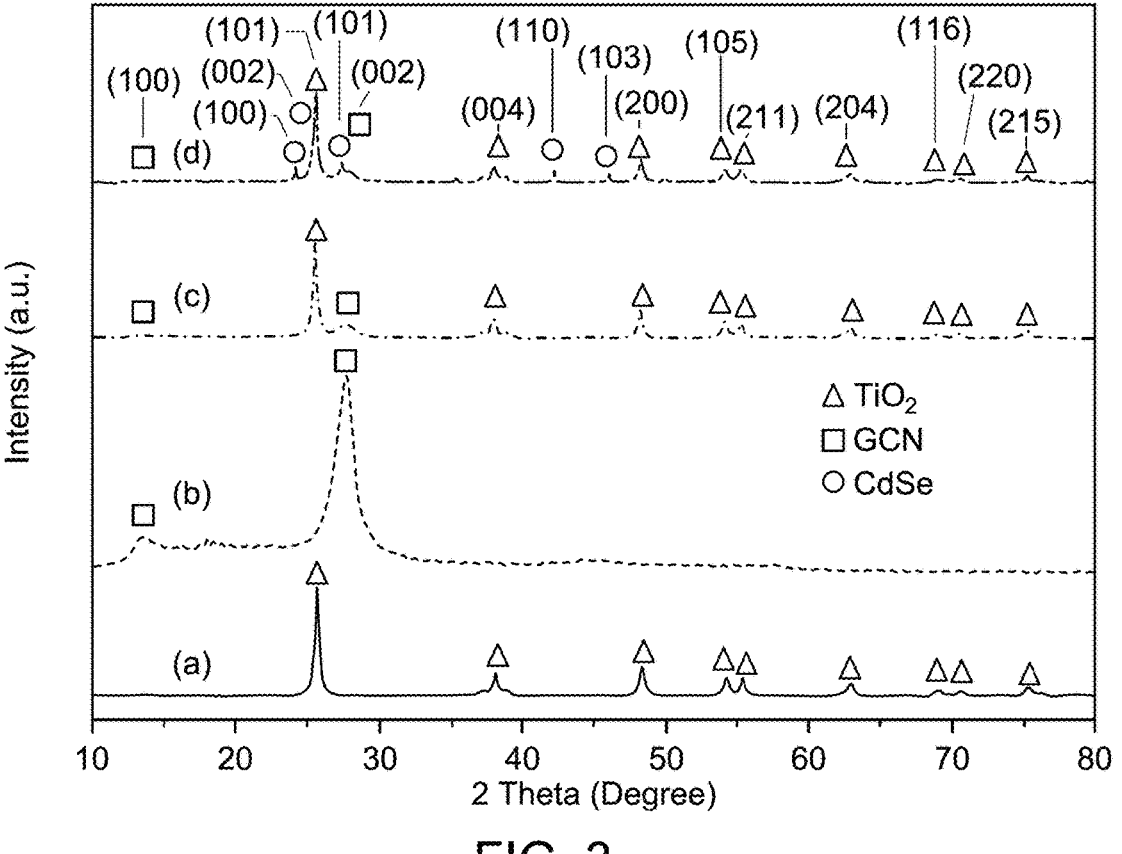
FIG. 3 shows X-ray diffraction (XRD) spectra of $TiO_2$, GCN, $TiO_2$/GCN nanocomposite, and the $TiO_2$/GCN/CdSe nanocomposite, according to certain embodiments.
Figure 4A:
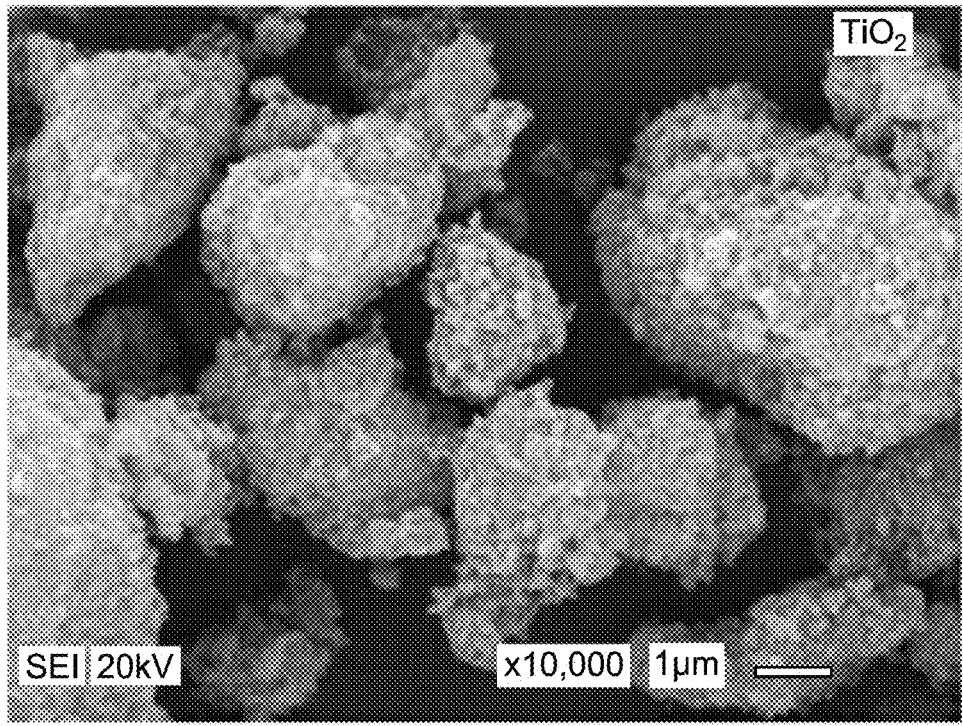
FIG. 4A shows a scanning electron microscopy (SEM) image of $TiO_2$ at a scale of 1 μm, according to certain embodiments.
Figure 4B:
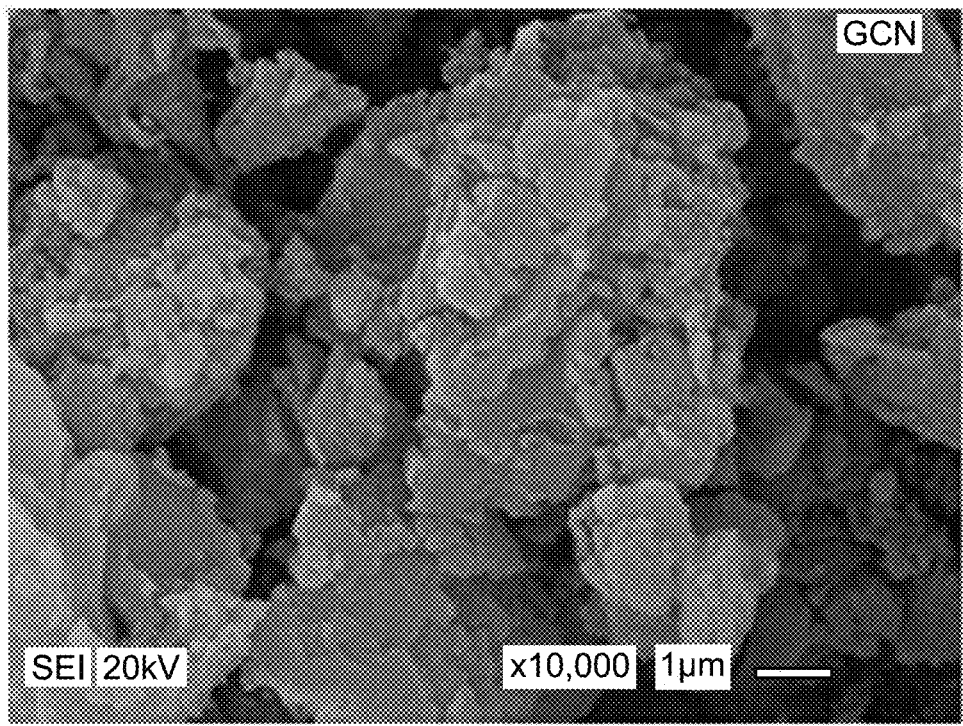
FIG. 4B shows an SEM image of GCN at a scale of 1 μm, according to certain embodiments.
Figure 4C:
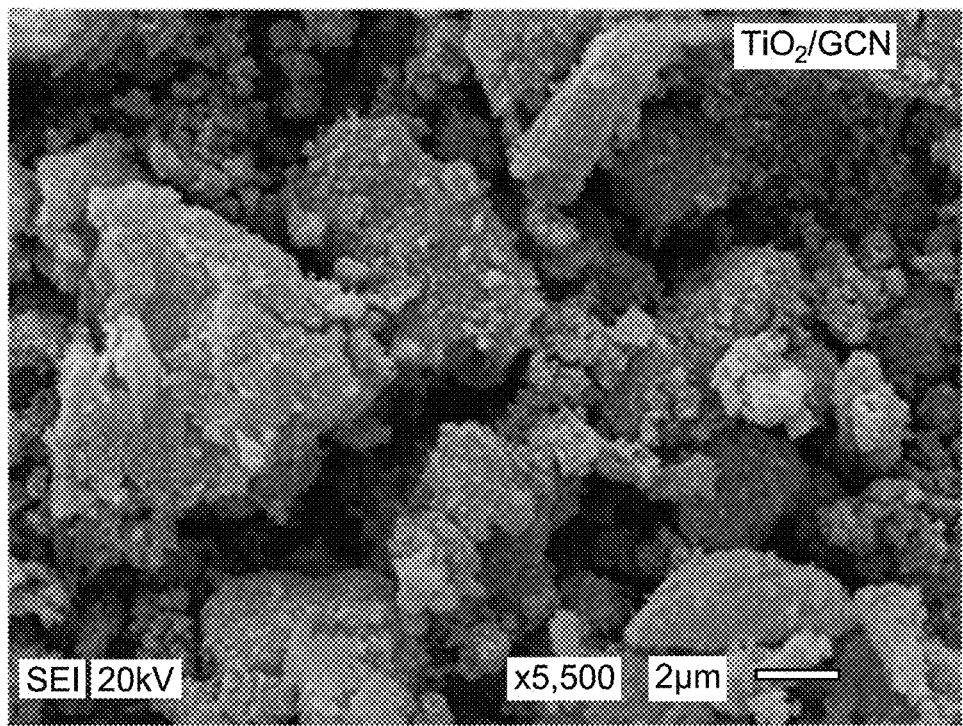
FIG. 4C shows an SEM image of $TiO_2$/GCN nanocomposite at a scale of 2 μm, according to certain embodiments.
Figure 4D:
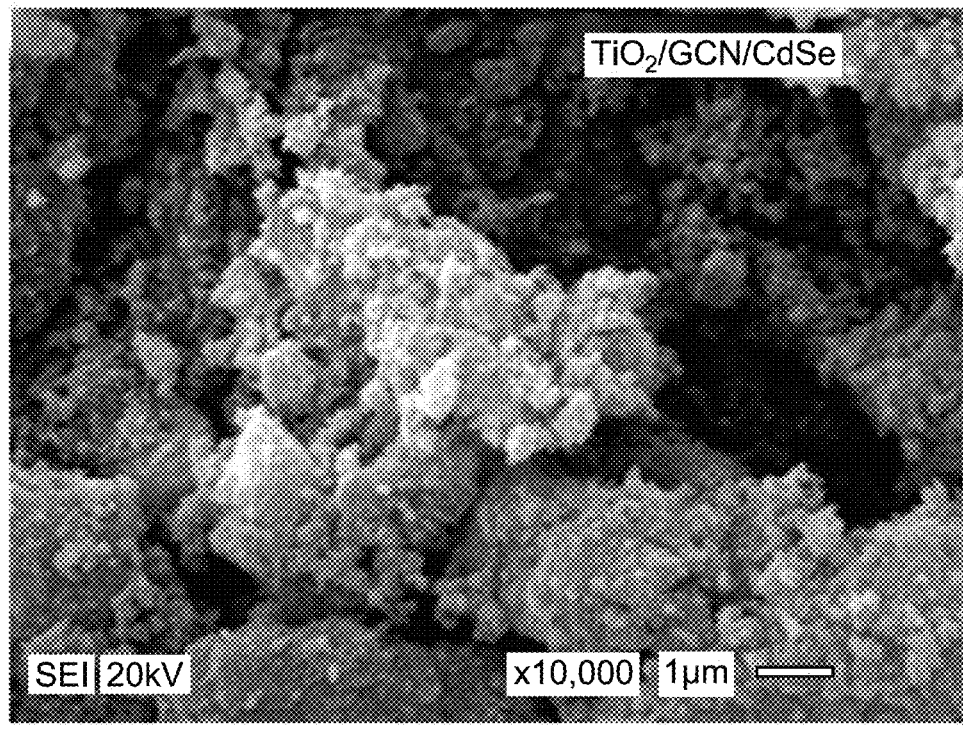
FIG. 4D shows an SEM image of the $TiO_2$/GCN/CdSe nanocomposite at a scale of 1 μm, according to certain embodiments.
Figure 5A:
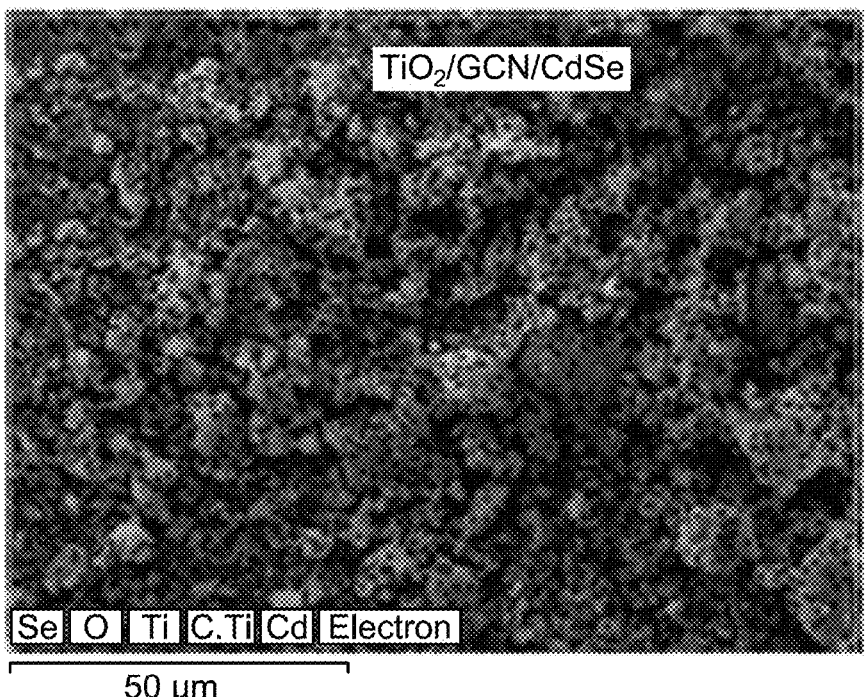
FIG. 5A shows an elemental mapping of the $TiO_2$/GCN/ CdSe nanocomposite using SEM-energy dispersive X-ray spectroscopy (EDS), according to certain embodiments.
Figure 5B:
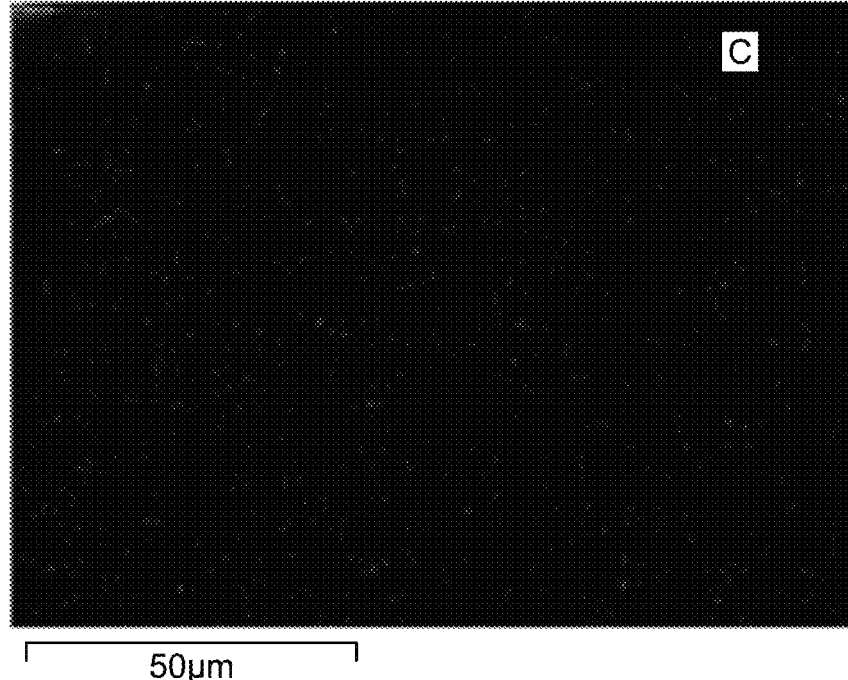
FIG. 5B shows an elemental mapping of C present in the $TiO_2$/GCN/CdSe nanocomposite using SEM-EDS, according to certain embodiments.
Figure 5C:
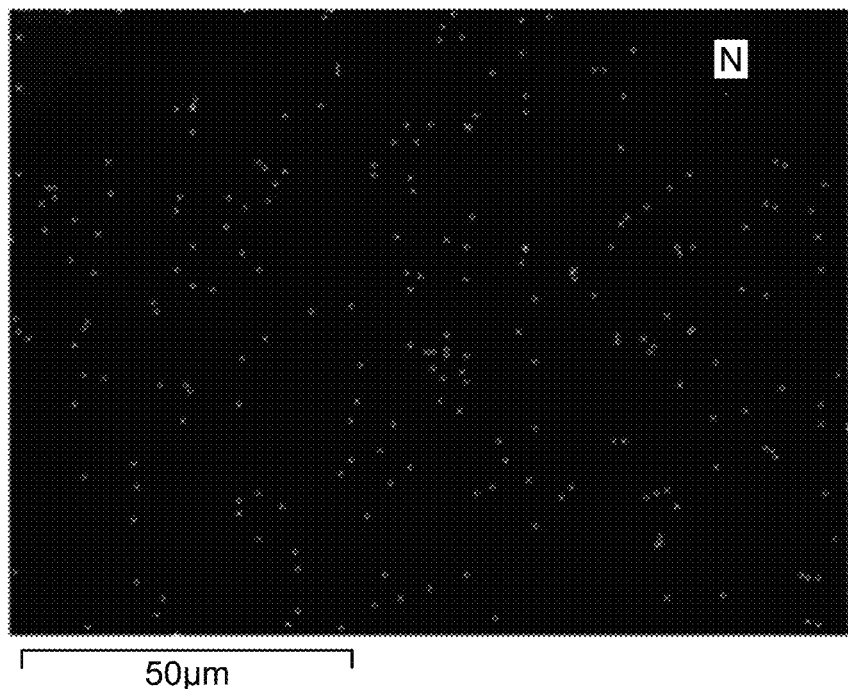
FIG. 5C shows an elemental mapping of N present in the $TiO_2$/GCN/CdSe nanocomposite using SEM-EDS, according to certain embodiments.
Figure 5D:
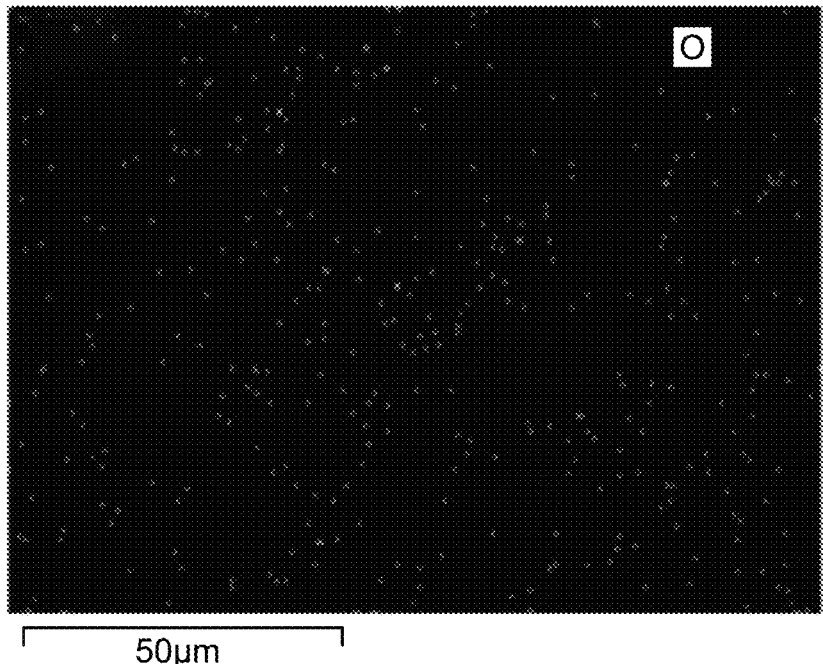
FIG. 5D shows an elemental mapping of O present in the $TiO_2$/GCN/CdSe nanocomposite using SEM-EDS, according to certain embodiments.
Figure 5E:
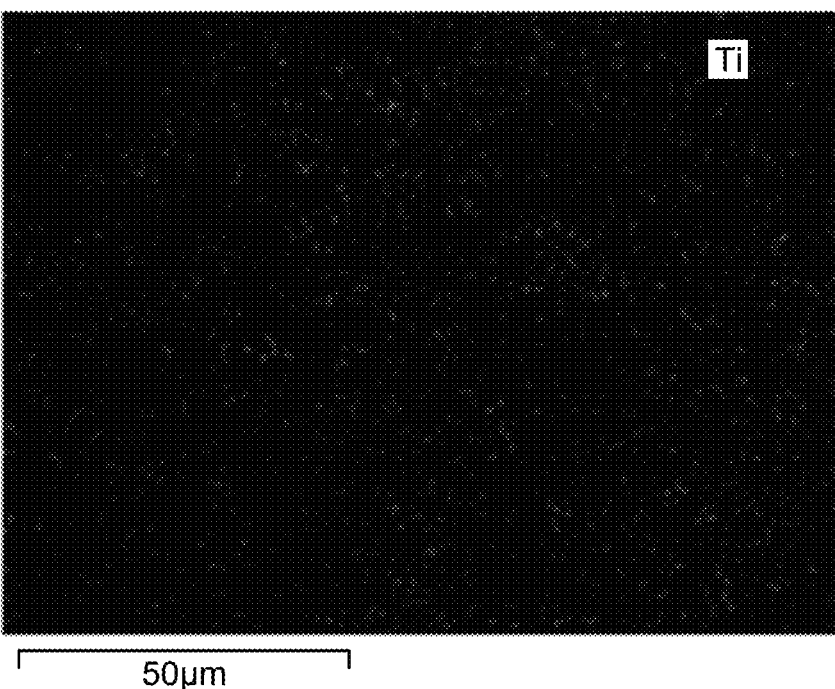
FIG. 5E shows an elemental mapping of Ti present in the $TiO_2$/GCN/CdSe nanocomposite using SEM-EDS, according to certain embodiments.
Figure 5F:
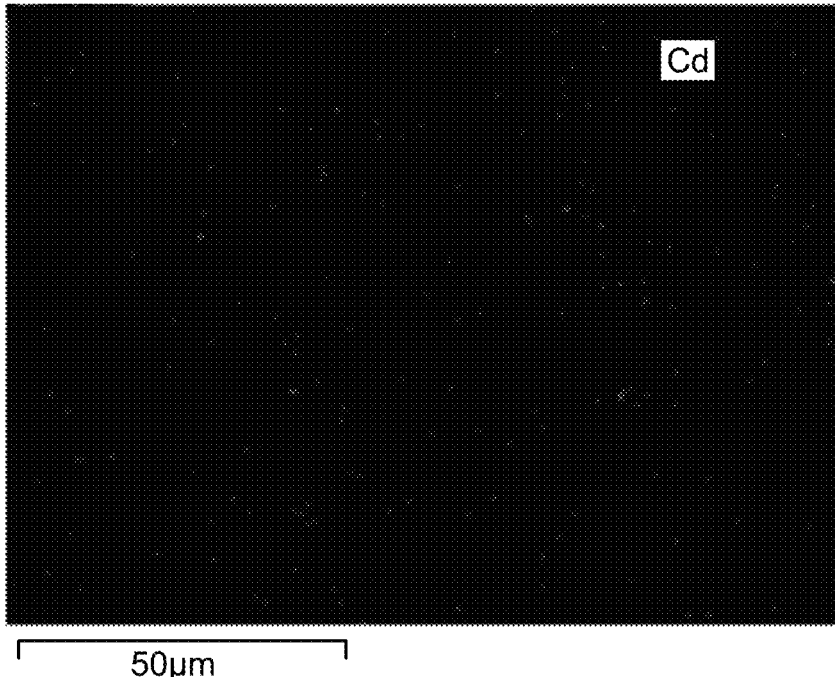
FIG. 5F shows an elemental mapping of Cd present in the $TiO_2$/GCN/CdSe nanocomposite using SEM-EDS, according to certain embodiments.
Figure 5G:
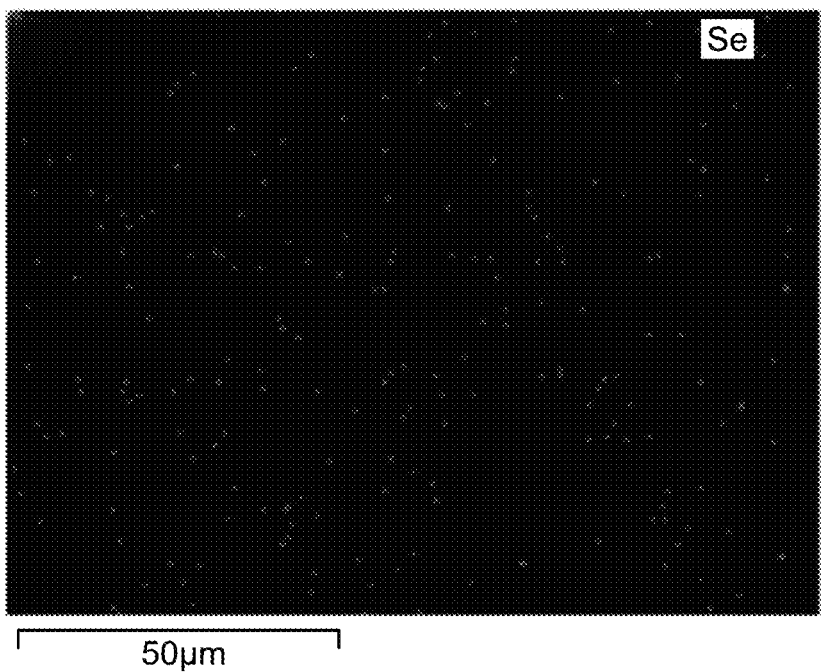
FIG. 5G shows an elemental mapping of Se present in the $TiO_2$/GCN/CdSe nanocomposite using SEM-EDS, according to certain embodiments.
Figure 5H:
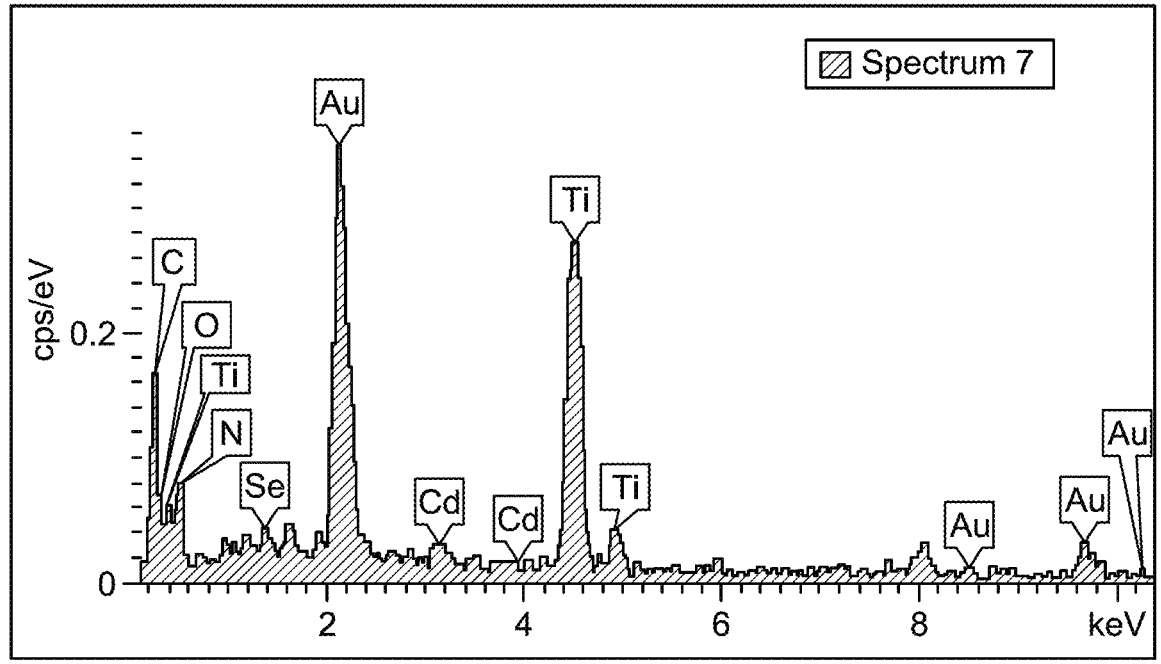
FIG. 5H shows an EDS spectrum of the $TiO_2$/GCN/CdSe nanocomposite, according to certain embodiments.

To study the structural changes and phases in the synthesized TiO$_2$ NPs, GCN, TiO$_2$/GCN/b-NCs, and TiO$_2$/GCN/CdSe t-NCs, X-ray diffraction was employed and presented in FIG. 3. In FIG. 3 displayed diffraction peaks with their corresponding planes of TiO$_2$ NPs at 25.64° (101), 38.16° (004), 48.37° (200), 54.22° (105), 55.35° (211), 62.95° (204), 69.07° (116), 70.52° (220), and 75.29° (215), respectively [M. Kocijan, L. Ćurković, D. Vengust, T. Radošević, V. Shvalya, G. Gonçalves, M. Podlogar, Synergistic Remediation of Organic Dye by Titanium Dioxide/Reduced Graphene Oxide Nanocomposite, Molecules. 28 (2023) 7326, incorporated herein by reference in its entirety]. These peaks correspond to the TiO$_2$ (anatase) with a tetragonal structure that matches the JCPDS Card No. 21-1272. The XRD pattern of GCN reveals two planes (100) and (002) at 13.32° and 27.66°, respectively. The asymmetrical g-h-triazine ring assembly inside the GCN structure generates a peak at 13.32° with low intensity. In comparison, a high-intensity peak at 27.66° is due to the interplanar stacking of conjugated aromatic rings in GCN. (JCPDS 87-1526) [E. Wierzyńska, K. Korytkowska, K. Kazimierczuk, T. Łęcki, K. Zarębska, K. P. Korona, M. Pisarek, B. Furtak, M. Skompska, The Role of Boron Dopant in the Improvement of Electron Transfer in g-C$_3$N$_4$ Photocatalyst, J. Phys. Chem. C. 128 (2024) 894-907, incorporated herein by reference in its entirety]. The additional planes of (100) and (002) at 13.32° and 27.66° were observed due to the successful anchoring of TiO$_2$ onto GCN sheets, as shown in FIG. 3. Likewise, In FIG. 3, the additional planes of (100) and (002) at 13.32° and 27.66° were also detected in the diffraction pattern along with five significant planes of (100), (002), 101), (110), and (103) at the diffraction peaks 24.15°, 25.21°, 27.39°, 42.18°, 48.22° due to the anchoring of CdSe onto GCN sheets. However, it was observed that the peak intensity of GCN at 13.32° and 27.66° for the planes (100) and (002) was reduced in b-NCs and t-NCs due to the sharp peaks of $TiO_2$ and CdSe powder, indicating successful synthesis of nanocomposites without any impurities.

To analyze the surface topography and morphology of the synthesized materials, a scanning electron microscopy (SEM) equipped with a energy dispersive X-ray spectroscopy (EDS) was used, as mentioned in FIGS. 4-5. FIGS. 4A-4B displays the cluster of aggregated $TiO_2$ nanoparticles and flat sheets of GCN. In b-NCs and t-NCs, well-anchored $TiO_2$ NPs and CdSe were observed onto GCN sheets as displayed in FIGS. 4C-4D, respectively. Additionally, EDS was carried out to study the presence and distribution of elements in $TiO_2$/GCN/CdSe t-NCs, as presented in FIGS. 5A-5H. It was observed that carbon (C), nitrogen (N), oxygen (O), titanium (Ti), cadmium (Cd), and selenium (Se) were present and distributed in the elemental mapping images (FIGS. 5A-5G), and EDS spectrum (FIG. 5H), confirming the synthesis of t-NCs without any impurities.

Figure 6A:
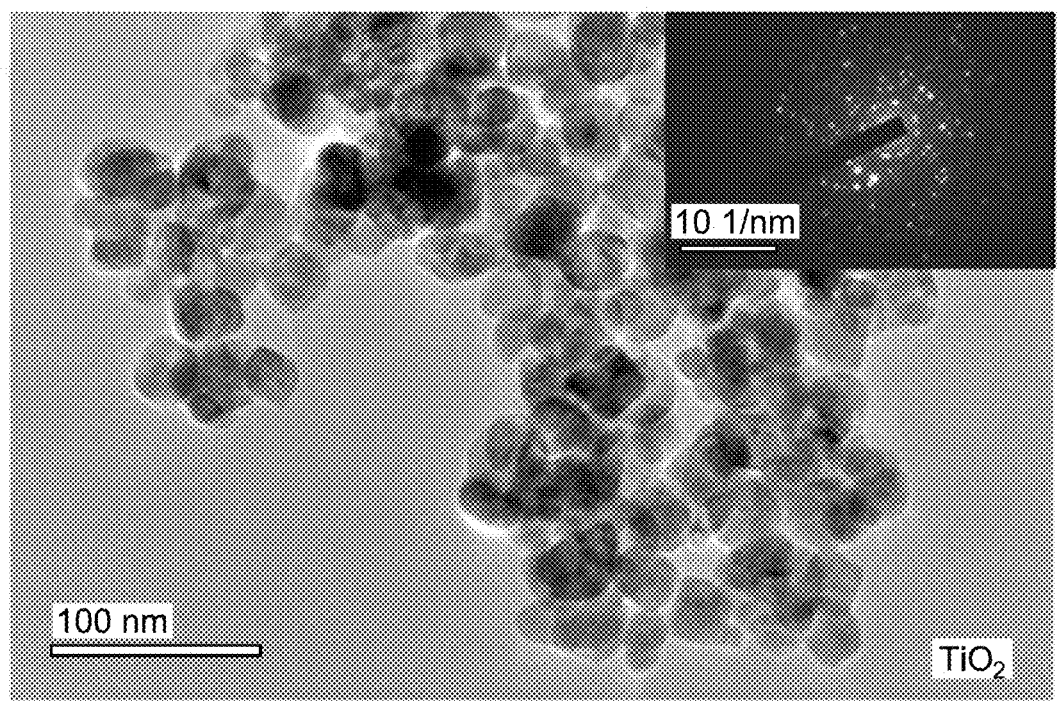
FIG. 6A shows a transmission electron microscopy (TEM) image and SAED pattern of the $TiO_2$, according to certain embodiments.
Figure 6B:
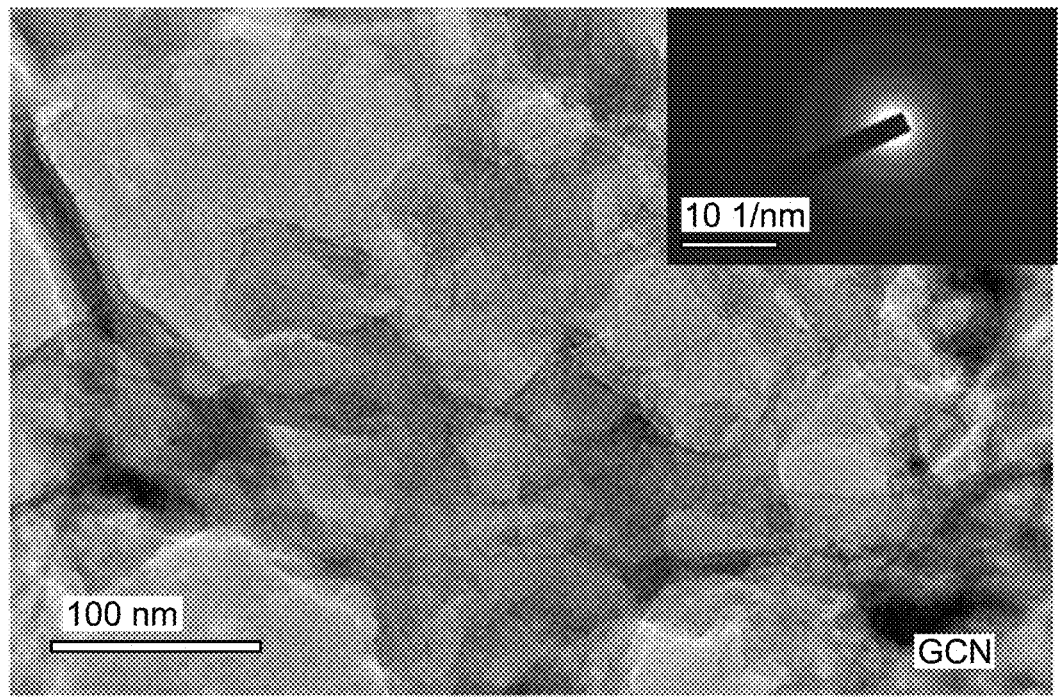
FIG. 6B shows a TEM image and SAED pattern of the GCN, according to certain embodiments.
Figure 6C:
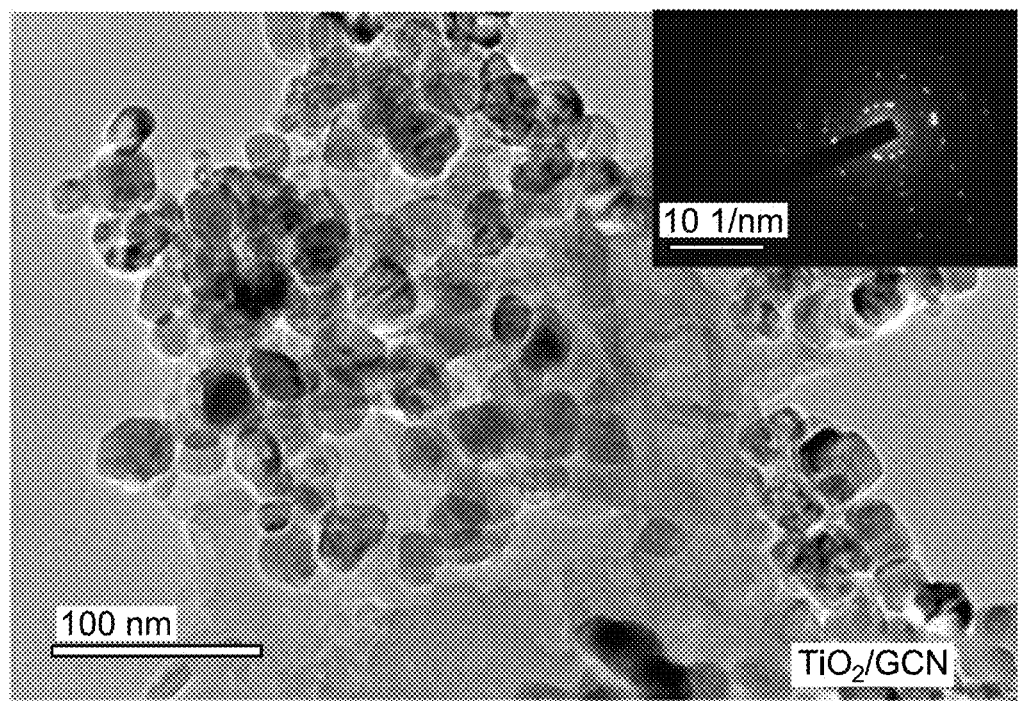
FIG. 6C shows a TEM image and SAED pattern of the $TiO_2$/GCN nanocomposite, according to certain embodiments.
Figure 6D:
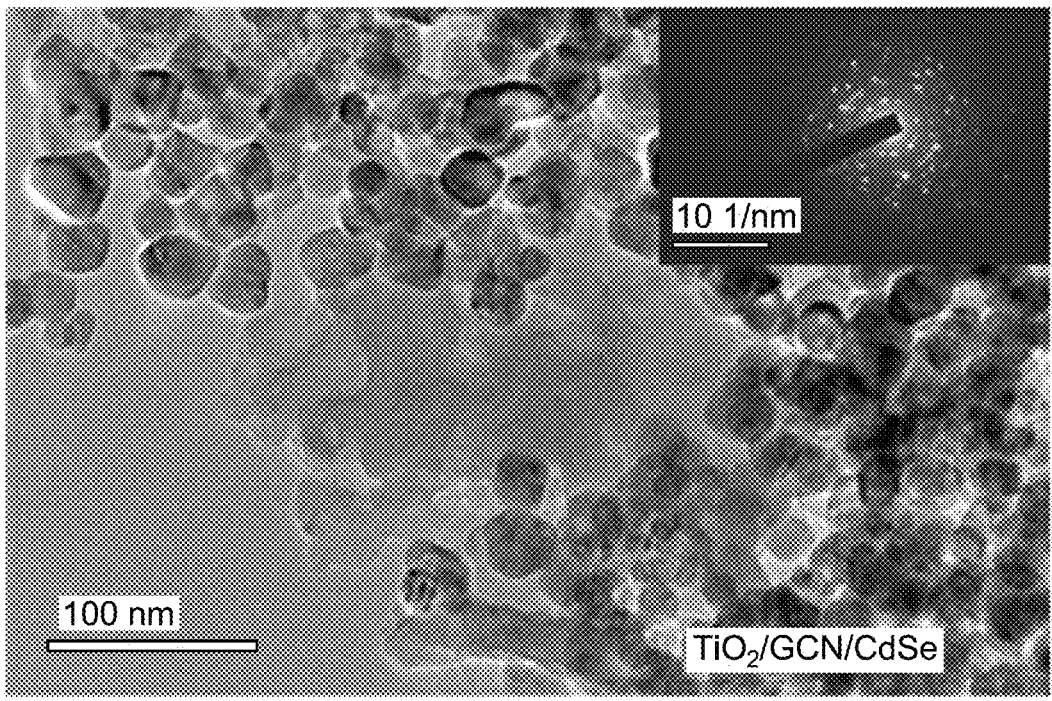
FIG. 6D shows a TEM image and SAED pattern of the $TiO_2$/GCN/CdSe nanocomposite, according to certain embodiments.

Additionally, bright field TEM (BF-TEM) and SAED were used to expand the morphological study, as shown in FIGS. 6A-6D. FIG. 6A shows the spherical nanoparticles of $TiO_2$, whereas the planar sheet structure was observed for GCN, as displayed in FIG. 6B, which is similar to SEM images. FIGS. 6C-6D illustrate the layered, aggregated sheets of GCN with $TiO_2$ NPs and CdSe, respectively. This likely results from the robust interaction between $TiO_2$ and GCN sheets for b-NCs and between $TiO_2$, GCN, and CdSe for t-NCs. The corresponding inset FIGS. 6A-6D of SAED clearly demonstrates that GCN is amorphous, whereas b-NCs and t-NCs exhibit a polycrystalline structure.

Figure 7A:
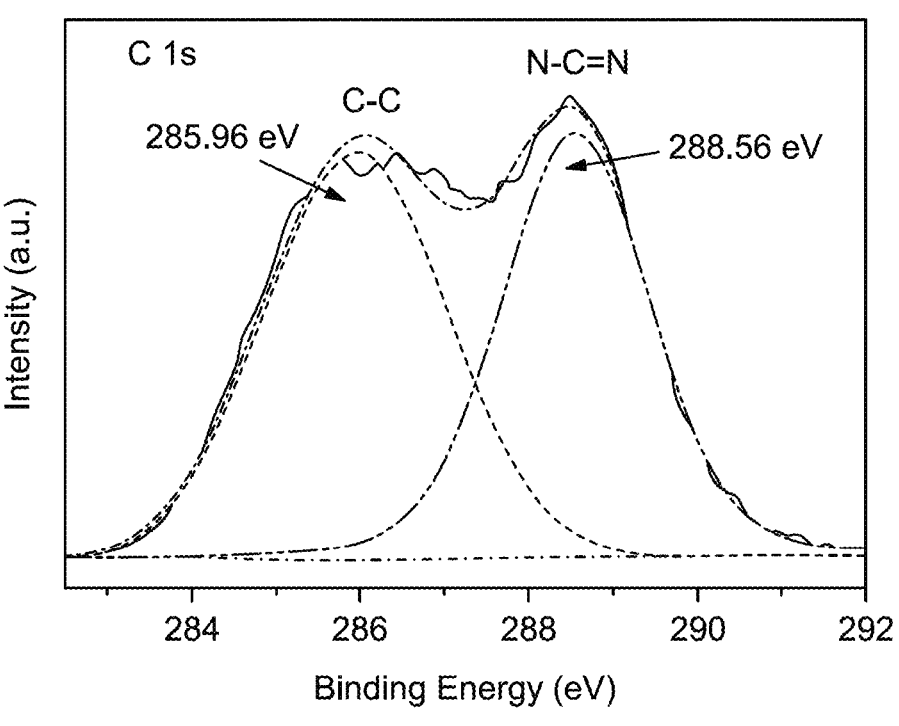
FIG. 7A shows a high-resolution X-ray photoelectron spectrometer (XPS) spectrum of C 1s for the $TiO_2$/GCN/ CdSe nanocomposite, according to certain embodiments.
Figure 7B:
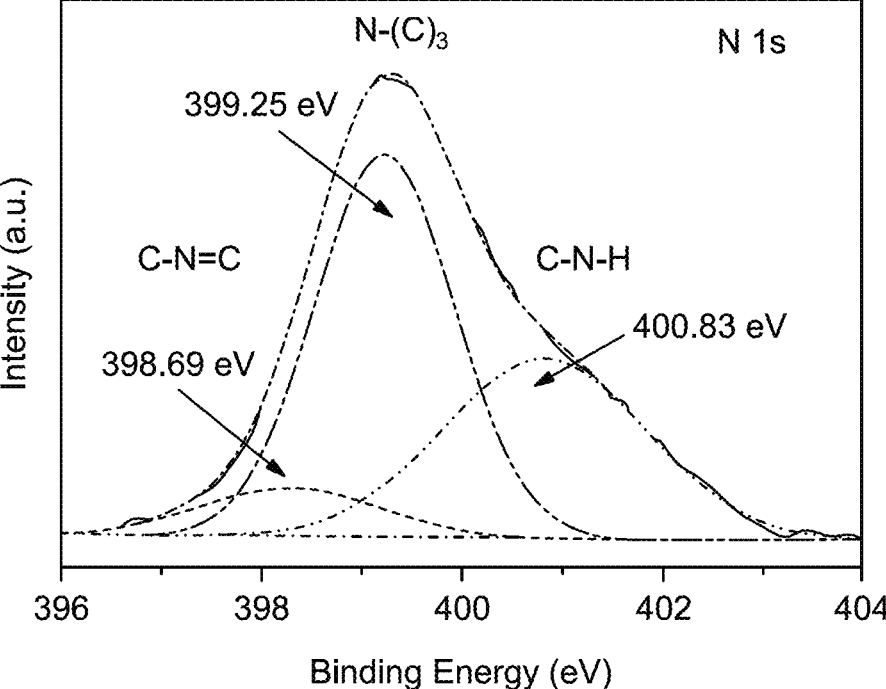
FIG. 7B shows a high-resolution XPS spectrum for N Is of the $TiO_2$/GCN/CdSe nanocomposite, according to certain embodiments.
Figure 7C:
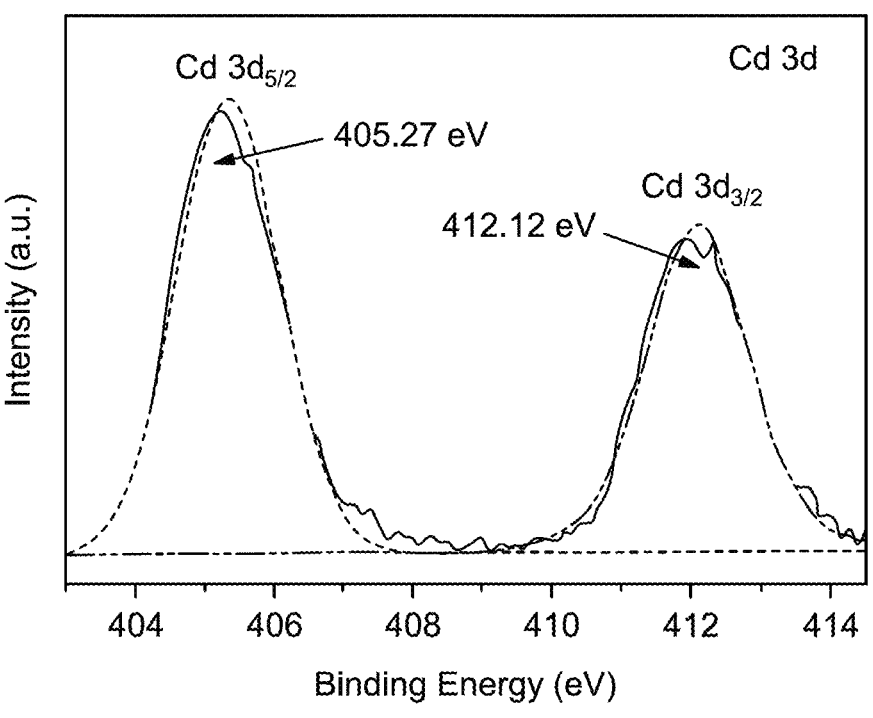
FIG. 7C shows a high-resolution XPS spectrum for Cd 3d of the $TiO_2$/GCN/CdSe nanocomposite, according to certain embodiments.
Figure 7D:
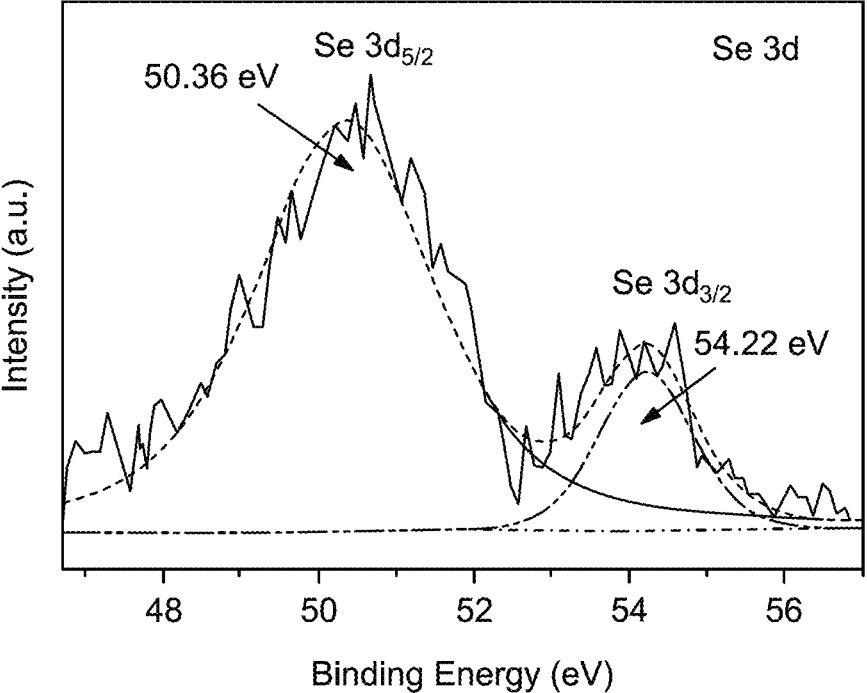
FIG. 7D shows a high-resolution XPS spectrum for Se 3d of the $TiO_2$/GCN/CdSe nanocomposite, according to certain embodiments.
Figure 7E:
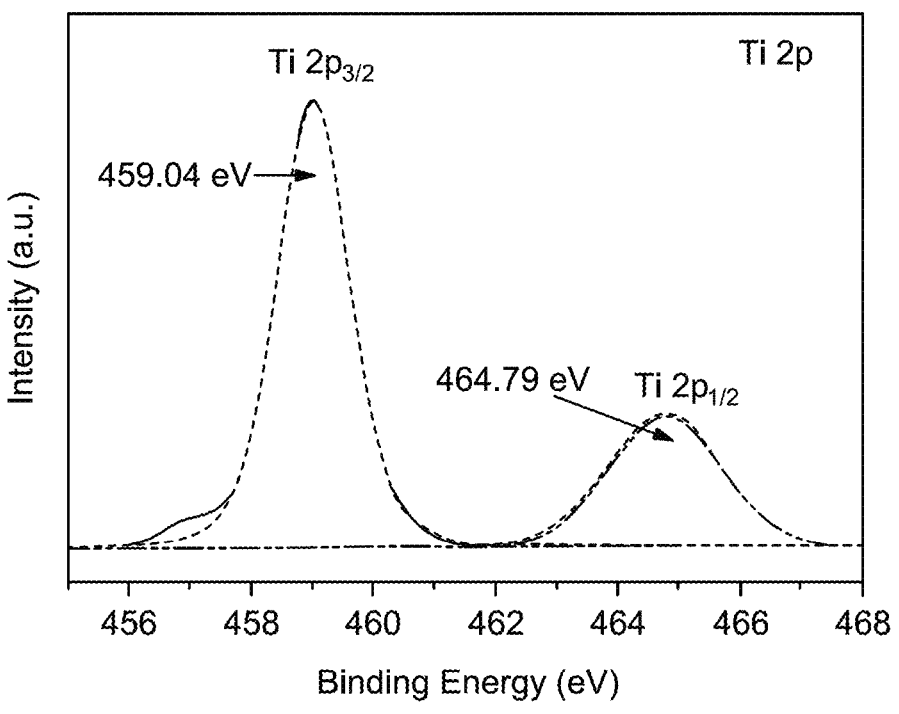
FIG. 7E shows a high-resolution XPS spectrum for Ti 2p of the $TiO_2$/GCN/CdSe nanocomposite, according to certain embodiments.
Figure 7F:
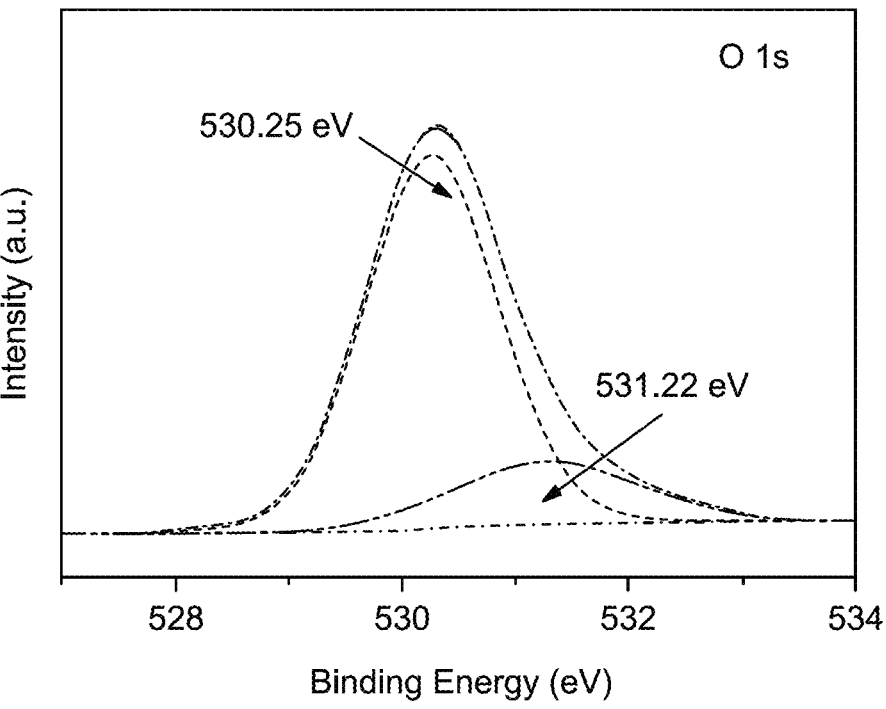
FIG. 7F shows a high-resolution XPS spectrum for O 1s of the $TiO_2$/GCN/CdSe nanocomposite, according to certain embodiments.

The surface composition and chemical bonding environment of the synthesized materials were studied using XPS. FIGS. 7A-7F shows the deconvoluted spectrum of elements in the synthesized t-NCs. In FIG. 7A, the C 1s spectra display two deconvoluted peaks at the binding energies of 285.96 eV and 288.56 eV that are associated with C=C ($sp^2$ bond) and $sp^2$-bonded carbon in aromatic rings that contain nitrogen (N—C=N), respectively [X. Kong, A. Chen, L. Chen, L. Feng, W. Wang, J. Li, Q. Du, W. Sun, J. Zhang, Enhanced Fenton-like catalytic performance of freestanding CuO nanowires by coating with g-$C_3N_4$ nanosheets, Sep. Purif. Technol. 272 (2021) 118850, incorporated herein by reference in its entirety]. FIG. 7B illustrates three distinct peaks at binding energies of 398.69 eV, 399.25 eV, and 400.83 eV for the N 1s deconvoluted spectra. The binding energy of N Is was found to be 398.69 eV, which was due to triazine rings (C—N=C), while the peaks at 399.25 eV and 400.83 eV corresponded to N—$(C)_3$ and C—N—H groups, respectively. FIG. 7C displays the two prominent peaks in the Cd 3d spectra, located at 405.27 eV and 412.12 eV, respectively, associated with Cd $3d_{5/2}$ and Cd $3d_{3/2}$ due to the spin-orbit coupling, showing $Cd^{2+}$ oxidation state [S. T. Ahamed, C. Kulsi, Kirti, D. Banerjee, D. N. Srivastava, A. Mondal, Synthesis of multifunctional CdSe and Pd quantum dot decorated CdSe thin films for photocatalytic, electrocatalytic and thermoelectric applications, Surfaces and Interfaces 25 (2021) 101149, incorporated herein by reference in its entirety]. Additionally, a deconvoluted spectrum of Se 3d exhibits two peaks at the binding energies of 50.36 eV and 54.22 eV corresponding to Se $3d_{5/2}$ and Se $3d_{3/2}$, as shown in FIG. 7D, confirming the $Se^{2-}$ oxidation state. FIG. 7E displays two distinct binding energy peaks of 459.04 eV and 464.79 eV, observed due to spin-orbit coupling attributed to Ti $2p_{3/2}$ and Ti $2p_{1/2}$, confirming the $Ti^{4+}$ oxidation state in the synthesized NCs [Y. Zhang, H. Tao, H. Wang, J. Hao, Y. Liu, Y. Yuan, Sol-gel synthesis of magnesium doped $TiO_2$ thin film and its application in dye sensitized solar cell, Opt. Mater. (Amst). 158 (2025) 116446, incorporated herein by reference in its entirety]. Moreover, the O 1s spectra were deconvoluted into two peaks, confirming the $O^{2-}$ oxidation states at 530.25 eV and 531.22 eV corresponding to the metal-oxygen bond and absorbed OH oxygen species in t-NCs, as shown in FIG. 7F, respectively. These findings demonstrate a robust interaction of $TiO_2$ and CdSe onto GCN 2D sheets.

Figure 8:
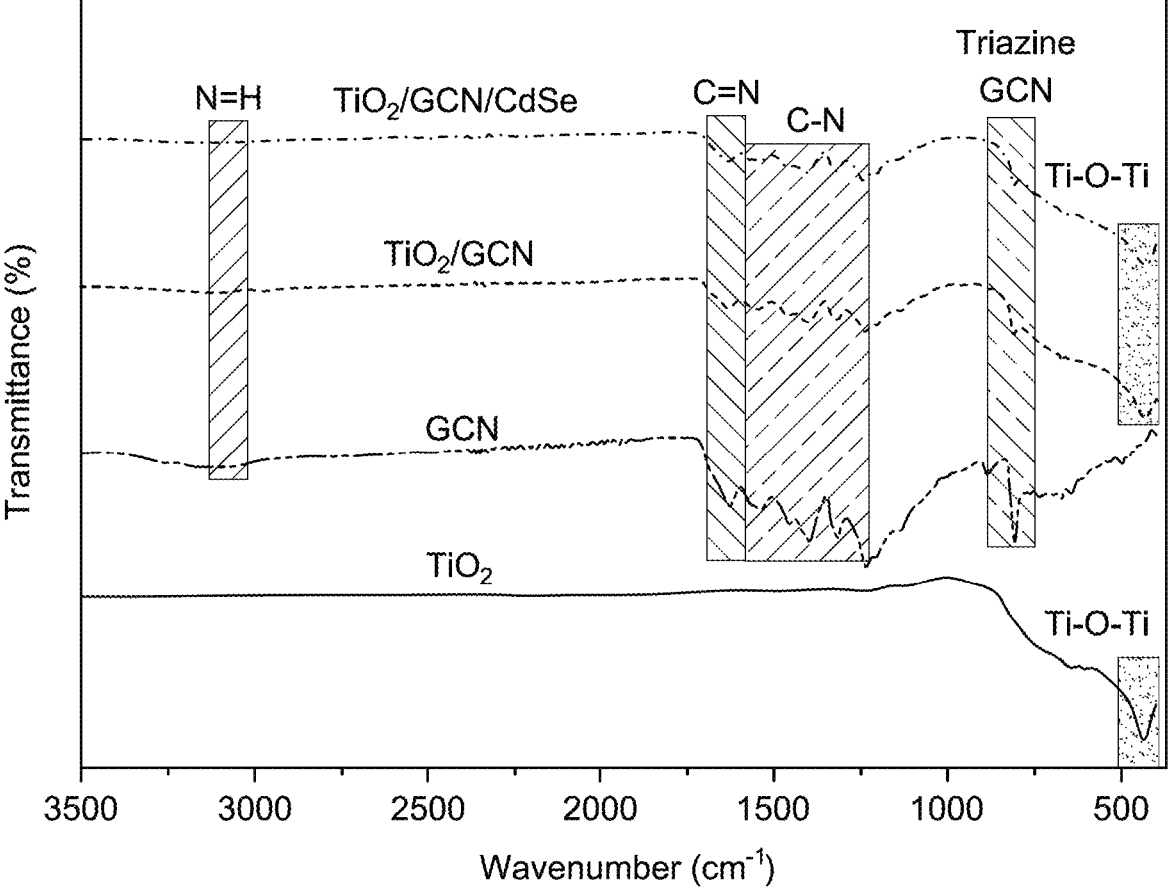
FIG. 8 shows a Fourier-transformed infrared (FTIR) spectra of $TiO_2$, GCN, $TiO_2$/GCN nanocomposite, and the $TiO_2$/ GCN/CdSe nanocomposite, according to certain embodiments.

FTIR was used to obtain further compositional information on the synthesized nanocomposites, as displayed in FIG. 8. The $TiO_2$ NPs exhibit a characteristic vibrational mode associated with stretching Ti—O—Ti at 450 $cm^{-1}$S [Amini, M. R. Mohammadi, Y. Li, Enhancing photovoltaic performance of dye-sensitized solar cells through $TiO_2$/g-$C_3N_4$ nanocomposite photoanodes for improved charge carrier management, Electrochim. Acta. 509 (2025) 145331; and S. M. Hossain, H. Park, H. J. Kang, J. S. Mun, L. Tijing, I. Rhee, J. H. Kim, Y. S. Jun, H. K. Shon, Facile synthesis and characterization of anatase $TiO_2$/g-CN composites for enhanced photoactivity under UV-visible spectrum, Chemosphere. 262 (2021) 128004, incorporated herein by references in their entireties]. The GCN peaks at 1630 $cm^{-1}$ correspond to C=N stretching vibrations, whereas peaks at 1233 $cm^{-1}$, 1317 $cm^{-1}$, 1402 $cm^{-1}$, 1452 $cm^{-1}$, and 1539 $cm^{-1}$ are associated with aromatic C—N stretching, respectively [S. M. Hossain, H. Park, H. J. Kang, J. S. Mun, L. Tijing, I. Rhee, J. H. Kim, Y. S. Jun, H. K. Shon, Facile synthesis and characterization of anatase $TiO_2$/g-CN composites for enhanced photoactivity under UV-visible spectrum, Chemosphere. 262 (2021) 128004; and W. J. Ong, L. L. Tan, S. P. Chai, S. T. Yong, A. R. Mohamed, Surface charge modification via protonation of graphitic carbon nitride (g-$C_3N_4$) for electrostatic self-assembly construction of 2D/2D reduced graphene oxide (rGO)/g-$C_3N_4$ nanostructures toward enhanced photocatalytic reduction of carbon dioxide to methane, Nano Energy. 13 (2015) 757-770, incorporated herein by references in their entireties]. The peak at 805 $cm^{-1}$ corresponds to the out-of-plane bending vibration of the C—N bonds within the s-triazine ring of GCN. It was observed a minor shift in C=N in b-NCs (C=N stretching vibrations peak at 1634 $cm^{-1}$) and t-NCs (C=N stretching vibrations peak at 1637 $cm^{-1}$) due to the electrostatic interaction and coordination bonding between $TiO_2$, CdSe, and GCN sheets. The electrostatic interaction specifically results from charge redistribution at the interface, whereas the lone pair electrons of nitrogen atoms in the C=N groups of GCN combine with $Ti^{4+}$ and $Cd^{2+}$ ions due to the coordination interaction, resulting in vibrational shift in b-NCs and t-NCs. The peak at 3160 $cm^{-1}$ is associated with the N—H stretching vibration in the GCN, b-NCs, and t-NCs, respectively.

Figure 9A:
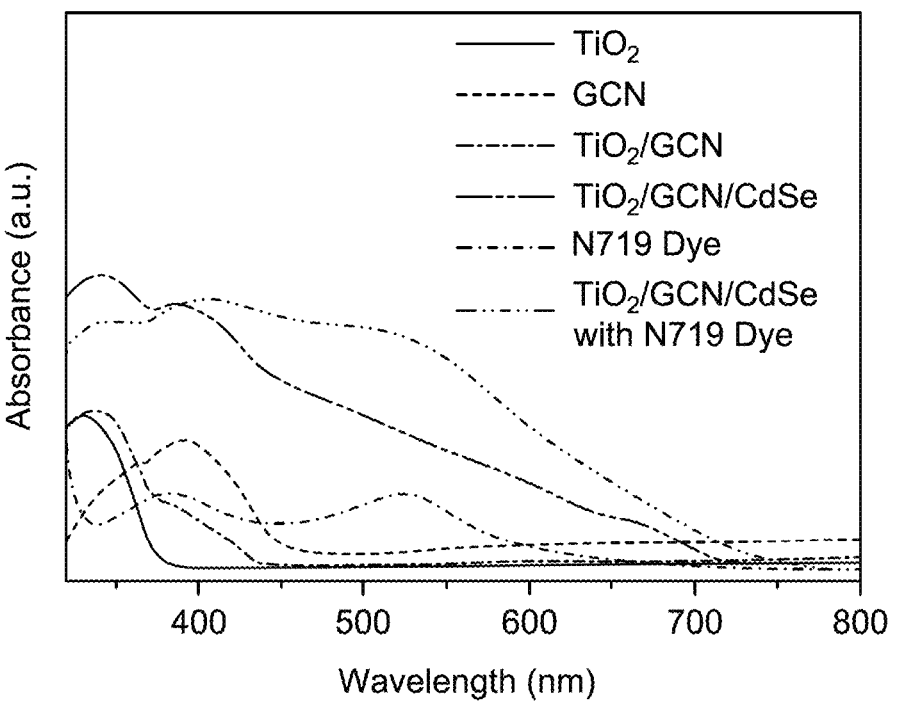
FIG. 9A shows an UV-visible DRS absorbance spectra of $TiO_2$, GCN, $TiO_2$/GCN nanocomposite, the $TiO_2$/GCN/ CdSe nanocomposite, N719 dye and the $TiO_2$/GCN/CdSe nanocomposite with adsorbed N719 dye, according to certain embodiments.

The solid-state ultraviolet-visible DRS absorption spectra and photoluminescence experiments were conducted to elucidate the light absorption and the optical band gap energy ($E_g$) along with photoluminescence properties of the synthesized nanomaterials, as displayed in FIGS. 9A-9D. The absorption curves of $TiO_2$ NPs, GCN sheets, $TiO_2$/GCN b-NCs, $TiO_2$/GCN/CdSe t-NCs, and $TiO_2$/GCN/CdSe t-NCs with N719 dye (0.5 mM in 20 ml ethanol) in the 320-800 nm range are shown in FIG. 9A. The N719 dye's absorption peaks display a visible spectrum between ~385 nm and ~524 nm due to the movement of electrons from metal-to-ligand charge transfer (MLCT) from Ru 4d orbital to the dye's $\pi^*$ molecular orbitals [M. R. Elmorsy, S. A. Badawy, A. Y. A. Alzahrani, A. El-Rayyes, Molecular design and synthesis of acetohydrazonoyl cyanide structures as efficient dye-sensitized solar cells with enhancement of the performance of the standard N-719 dye upon co-sensitization, Opt. Mater.

Figure 9B:
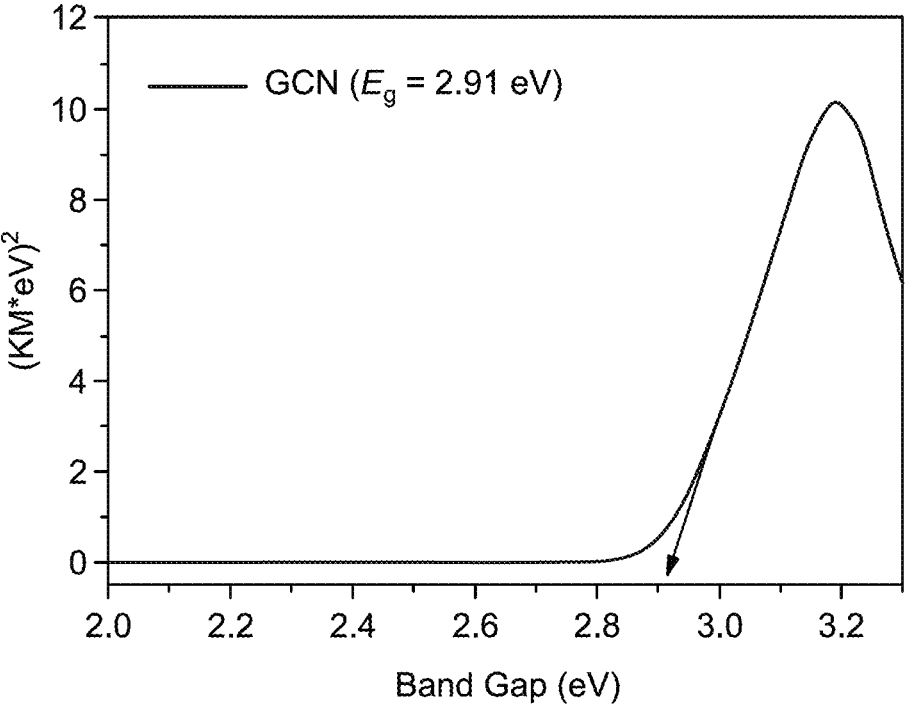
FIG. 9B shows a band gap energy of the GCN, according to certain embodiments.
Figure 9C:
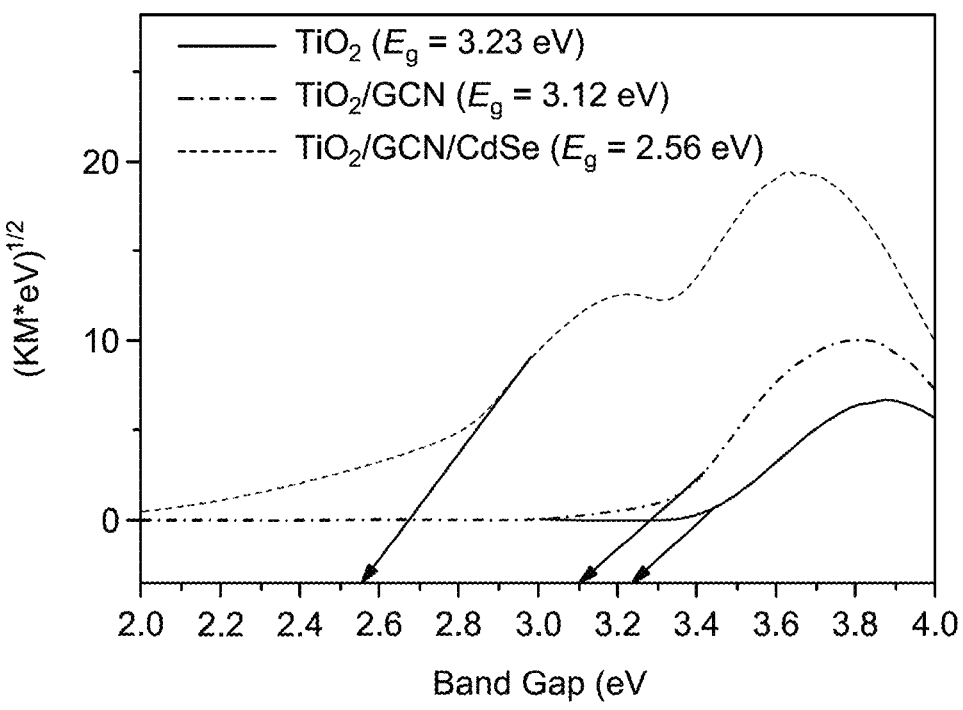
FIG. 9C shows a band gap energy of the $TiO_2$, $TiO_2$/GCN nanocomposite, and $TiO_2$/GCN/CdSe nanocomposite, according to certain embodiments.

(Amst). 135 (2023) 113359, incorporated herein by reference in its entirety]. The absorption edge for $TiO_2$ NPs is observed at approximately ~380 nm [T. Zhao, Z. Xing, Z. Xiu, Z. Li, S. Yang, Q. Zhu, W. Zhou, Surface defect and rational design of $TiO_2$-x nanobelts/g-$C_3N_4$ nanosheets/CdS quantum dots hierarchical structure for enhanced visible-light-driven photocatalysis, Int. J. Hydrogen Energy. 44 (2019) 1586-1596; and K. Portillo-Cortez, A. Martinez, A. Dutt, G. Santana, N719 Derivatives for Application in a Dye-Sensitized Solar Cell (DSSC): A Theoretical Study, J. Phys. Chem. A. 123 (2019) 10930-10939, incorporated herein by references in their entireties]. An enhanced absorption spectrum at a higher wavelength was observed for $TiO_2$/GCN b-NCs, demonstrating a modest enhancement in visible light absorption compared to $TiO_2$ NPs, attributed to the robust and extensive absorption band shift towards the visible spectrum. Likewise, the absorption spectrum for $TiO_2$/GCN/CdSe t-NCs is also enhanced more at the higher wavelength as a result of the anchoring of CdSe onto $TiO_2$/GCN, leading to the red shift in the spectrum, signifying a reduction in the optical band gap of the t-NCs. Furthermore, the synergistic effect of N719 dye and CdSe shows a larger light absorption in the visible range, which generates higher charge carrier production and charge separation, producing high current density for devices built with t-NCs photoanode. The band gap energy was calculated using the well-known Tauc equation 1; calculated values are shown in FIGS. 9B-9C [Ł. Haryński, A. Olejnik, K. Grochowska, K. Siuzdak, A facile method for Tauc exponent and corresponding electronic transitions determination in semiconductors directly from UV-Vis spectroscopy data, Opt. Mater. (Amst). 127 (2022) 112205, incorporated herein by reference in its entirety].

$$(\alpha^* E)^{1/n} = A(E - Eg) \qquad (1)$$

Where Eg denotes the optical band gap, a stands for absorption coefficient, A is the constant independent of frequency, and n stands for the type of electronic transitions, i.e., n=1/2 and n=2 for direct and indirect electron transition from the valence band to the conduction band, respectively. The Tauc plot represents a graph of the Kubelka-Munk function (KM) vs E, and the band gap can be determined using the x-intercept of the plotted curve [U. Baig, M. A. Dastageer, M. A. Gondal, A. B. Khalil, Photocatalytic deactivation of sulphate reducing bacteria using visible light active CuO/$TiO_2$ nanocomposite photocatalysts synthesized by ultrasonic processing, J. Photochem. Photobiol. B Biol. 242 (2023) 112698, which is incorporated herein by reference in its entirety]. The optical band gaps for $TiO_2$ NPs, GCN, $TiO_2$/GCN b-NCs, and $TiO_2$/GCN/CdSe t-NCs were determined to be 3.23 eV, 2.91 eV, 3.12 eV, and 2.56 eV respectively (FIGS. 9B-9C).

Figure 9D:
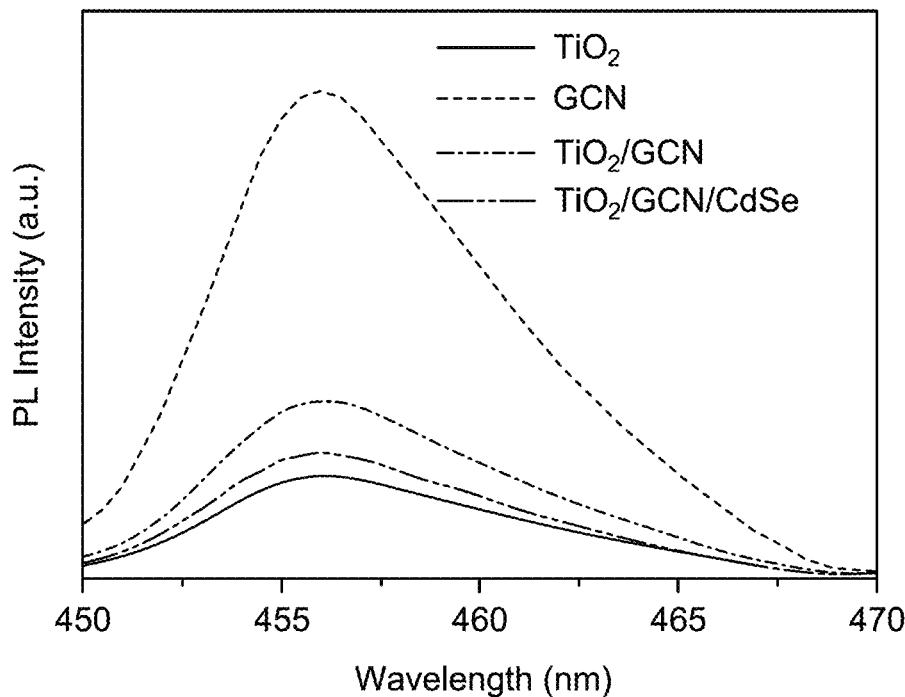
FIG. 9D shows a photolumnisence (PL) spectra of the $TiO_2$, GCN, $TiO_2$/GCN nanocomposite, and the $TiO_2$/GCN/ CdSe nanocomposite, according to certain embodiments.

Additionally, the charge separation efficiency of the b-NCs and t-NCs was analyzed using PL, as shown in FIG. 9D. The photoluminescence spectra of GCN exhibit a prominent emission peak at approximately 456 nm, presumably associated with the intrinsic recombination of electron-hole pairs in GCN [H. Lv, H. Hu, C. Cui, P. Lin, P. Wang, H. Wang, L. Xu, J. Pan, C. Li, Enhanced performance of dye-sensitized solar cells with layered structure graphitic carbon nitride and reduced graphene oxide modified $TiO_2$ photoanodes, Appl. Surf. Sci. 422 (2017) 1015-1021, incorporated herein by reference in its entirety]. The luminescence in GCN arises from transitions between $\pi^*$ antibonding states in the conduction band, and lone pair states in the valence band. The luminescence of GCN is attributed to the states including the σ band ($sp^3$ C—N), π band ($sp^2$ C—N), and the lone pair state of the bridging nitride atom [C. Yavuz, S. E. Ela, Fabrication of g-$C_3N_4$-reinforced CdS nanosphere-decorated $TiO_2$ nanotablet composite material for photocatalytic hydrogen production and dye-sensitized solar cell application, J. Alloys Compd. 936 (2023) 168209, incorporated herein by reference in its entirety]. The PL results of $TiO_2$/GCN b-NCs and $TiO_2$/GCN/CdSe t-NCs indicate that the interaction of $TiO_2$ and CdSe onto GCN substantially quenches the PL of pure GCN, showing effective separation of interfacial charge carriers. However, $TiO_2$/GCN/CdSe t-NCs show more PL quenching than $TiO_2$/GCN b-NCs, resulting in more charge separation at the interfaces, leading to faster charge transport and slower recombination and hence, increasing the device performance.

Figure 10A:
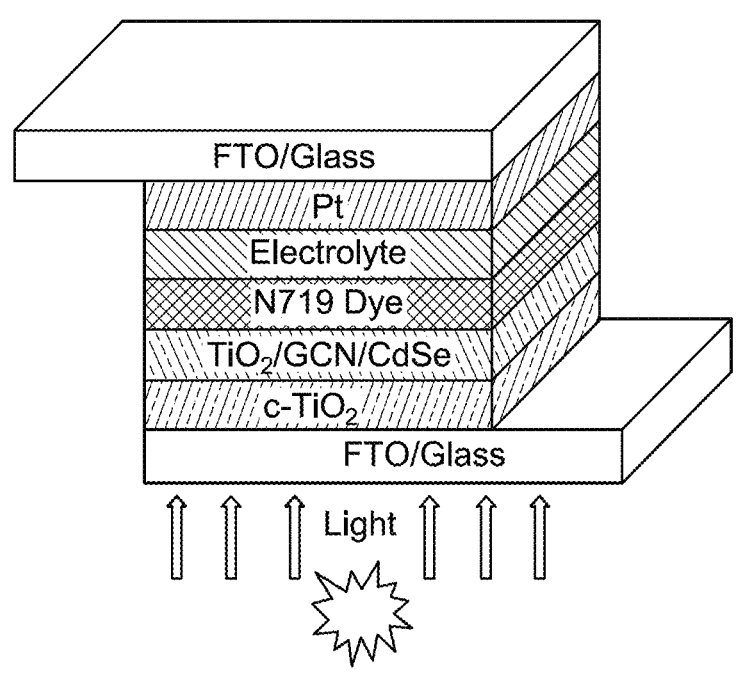
FIG. 10A shows a device architecture of a dye-sensitized solar cell (DSSCs), according to certain embodiments.
Figure 10B:
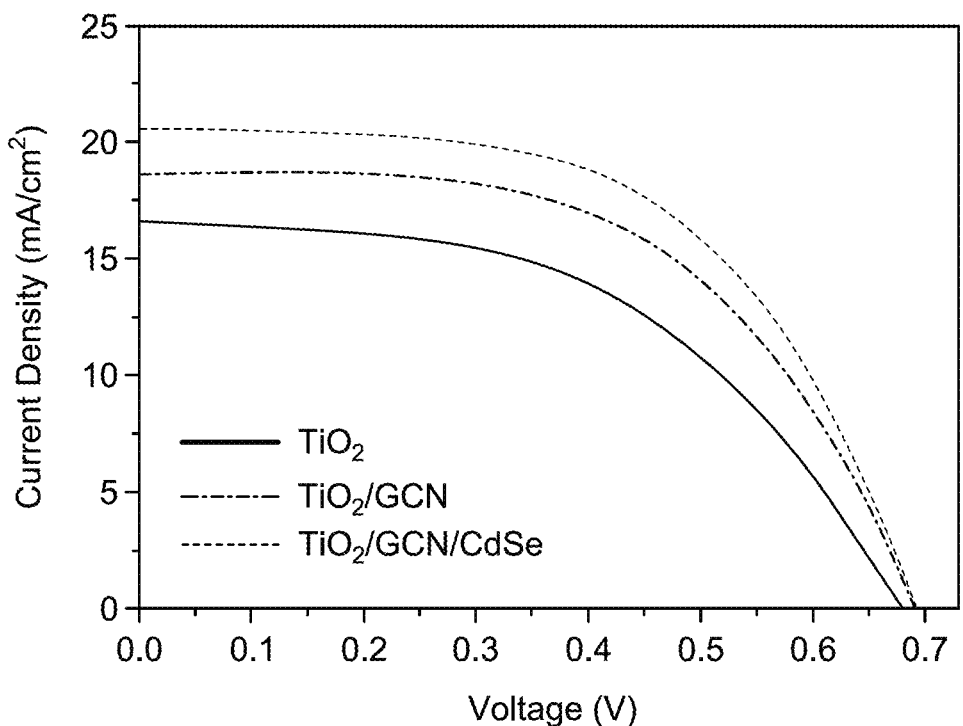
FIG. 10B shows a current density-voltage (J-V) curve with the $TiO_2$, $TiO_2$/GCN nanocomposite, and the $TiO_2$/GCN/CdSe nanocomposite as photoanodes, according to certain embodiments.
Figure 10C:
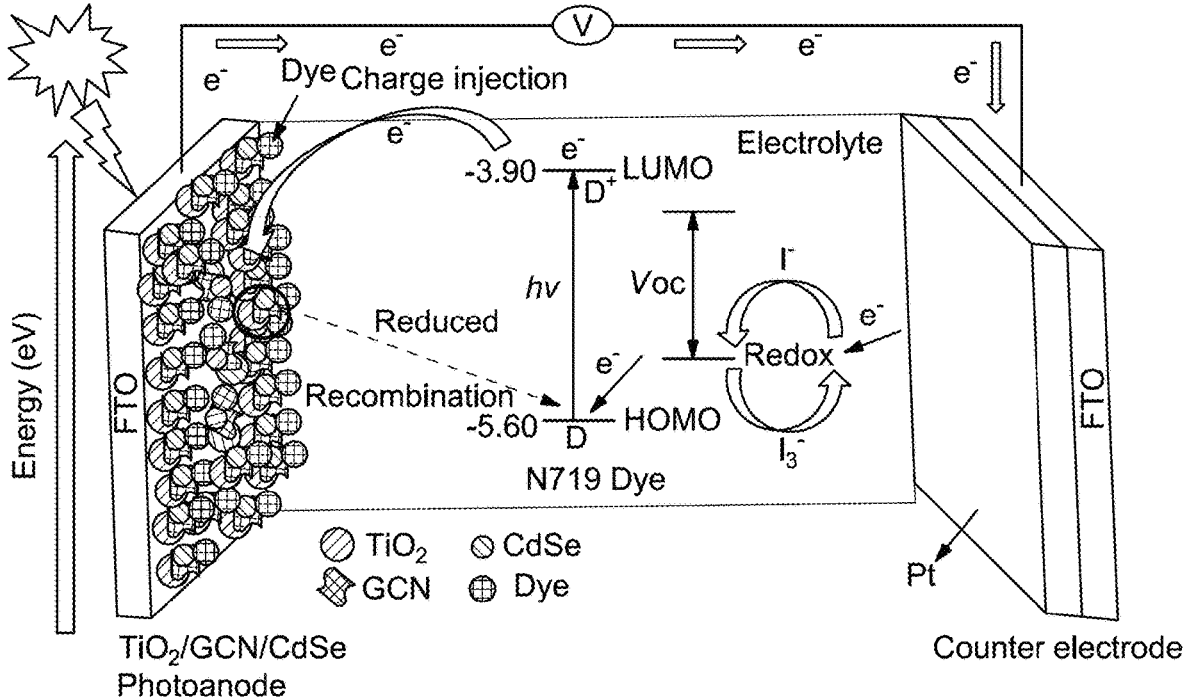
FIG. 10C shows a plausible mechanism of DSSCs, according to certain embodiments.

The DSSC devices were fabricated having a structure of glass/FTO/c-$TiO_2$/$TiO_2$/N719 Dye/$I_3$/Pt, glass/FTO/c-$TiO_2$/$TiO_2$/GCN/N719 Dye/$I_3$/Pt, and glass/FTO/c-$TiO_2$/$TiO_2$/GCN/CdSe/N719 Dye/$I_3$/Pt. The device architecture, J-V curves, and plausible mechanism of DSSCs utilizing various photoanodes are illustrated in FIGS. 10A-10C, respectively, with the associated photovoltaic performance data of the fabricated devices tabulated in Table 1.

TABLE 1

| Device parameters of the fabricated DSSC using various photoanodes. | | | | |
|---|---|---|---|---|
| Fabricated DSSCs with various photoanodes | $V_{OC}$ (V) | FF (%) | $J_{sc}$ (mA/cm$^2$) | PCE (%) |
| $TiO_2$ photoanode | 0.67 | 50.00 | 16.59 | 5.56 |
| $TiO_2$/GCN photoanode | 0.69 | 55.20 | 18.61 | 7.08 |
| $TiO_2$/GCN/CdSe photoanode | 0.69 | 56.70 | 20.56 | 8.04 |

The device with $TiO_2$ as the photoanode demonstrated a conversion efficiency (PCE) of 5.56%, an open circuit voltage ($V_{OC}$) of 0.67 V, a fill factor (FF) of 50%, and a short circuit current density ($J_{SC}$) of 16.59 mA/cm$^2$. Whereas the device with $TiO_2$/GCN b-NCs as the photoanode exhibited $J_{SC}$, $V_{OC}$, FF, and PCE of 18.61 mA/cm$^2$, 0.69 V, 55.20%, and 7.08%, respectively. The rise in the $J_{SC}$ and PCE values for the $TiO_2$/GCN b-NCs is ascribed to more dye adsorption by increasing the surface area, and an appropriate energy band level alignment promotes more charge transport and reduced recombination in the devices [Q. Li, T. Zhang, D. Cui, F. Li, g-$C_3N_4$@$TiO_2$ photoanodes for high-efficiency QDSSCs: improved electron transfer and photochemical stability, Dalt. Trans. 53 (2024) 7742-7750; and K. Qi, S. yuan Liu, Y. Chen, B. Xia, G. D. Li, A simple post-treatment with urea solution to enhance the photoelectric conversion efficiency for $TiO_2$ dye-sensitized solar cells, Sol. Energy Mater. Sol. Cells. 183 (2018) 193-199, incorporated herein by references in their entireties]. Likewise, the devices with $TiO_2$/GCN/CdSe t-NCs based photoanode show superior performance PCE of 8.04% ($J_{SC}$=20.56 mA/cm$^2$, FF=56.70%, $V_{OC}$=0.69 V) as compared to b-NCs and $TiO_2$ based photoanode. This could be because of the anchoring of CdSe onto $TiO_2$/GCN b-NCs, which provides extended visible light absorption, leading to enhanced charge injection and transport with reduced charge carrier recombination in fabricated devices [J. M. AlGhamdi, S. AlOmar, M. A. Gondal, R. Moqbel, M. A. Dastageer, Enhanced efficiency of dye co-sensitized solar cells based on pulsed-laser-synthesized cadmium-selenide quantum dots, Sol. Energy. 209 (2020) 108-117, incorporated herein by reference in its entirety]. The plausible mechanism is given in FIG. 10C.

Upon the light absorption, electrons are promoted from the HOMO to the LUMO level of the N719 dye, and these excited electrons are injected into the CdSe, where they simultaneously transfer to GCN, which promotes the electron transport to $TiO_2$ and leaves the dye in the oxidized state ($D^+$). The iodide ions (I) in the iodolyte (Z-50) electrolyte transfer electrons to the oxidized dye, reverting it to its ground state (D) and generating triiodide ions ($I_3^-$), which diffuse to the counter electrode. $TiO_2$ facilitates electron movement to the external circuit, where these electrons reduce the ($I_3^-$) into ($I^-$), completing the redox cycle. Simultaneously, CdSe absorbs visible light and injects electrons into $TiO_2$ via GCN. This dual electron injection (from N719 dye and CdSe) significantly improves charge separation, leading to high $J_{SC}$ and PCE with $TiO_2$/GCN/CdSe t-NCs photoanode. The effective regeneration of the dye and electrolyte guarantees continuous photon to electron conversion, hence improving the overall device performance of the DSSC.

Figure 11A:
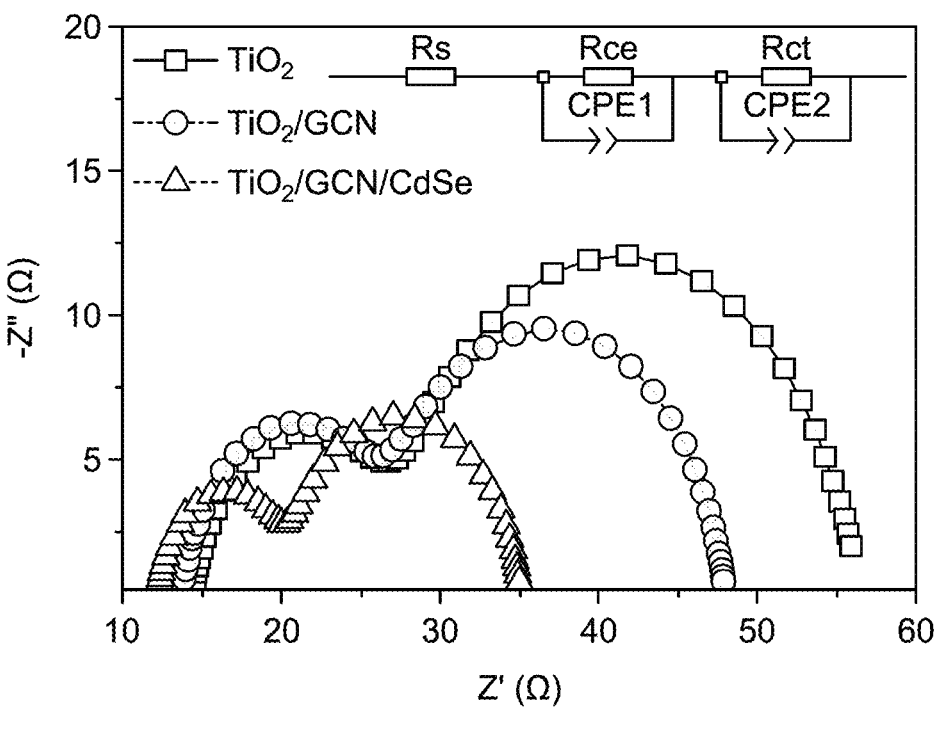
FIG. 11A shows an electrochemical impedance spectroscopy (EIS) spectra of the $TiO_2$, $TiO_2$/GCN nanocomposite, and the $TiO_2$/GCN/CdSe nanocomposite used as photoanodes and a Nyquist plot with equivalent circuit, according to certain embodiments.

EIS was used to examine the resistance of charge transfer and charge carrier dynamics in the fabricated DSSCs using different photoanodes [K. Qi, S. yuan Liu, Y. Chen, B. Xia, G. D. Li, A simple post-treatment with urea solution to enhance the photoelectric conversion efficiency for TiO2 dye-sensitized solar cells, Sol. Energy Mater. Sol. Cells. 183 (2018) 193-199, incorporated herein by reference in its entirety]. The EIS results for different photoanodes, such as $TiO_2$, $TiO_2$/GCN b-NCs, and $TiO_2$/GCN/CdSe t-NCs photoanodes, are presented in FIGS. 11A-11B. The fitted Nyquist plots of the DSSCs fabricated with three distinct photoanodes, along with the equivalent circuit, are presented in FIG. 11A. It was observed that each fabricated device exhibited two distinct semicircles in the Nyquist plot's middle and high-frequency domains. The initial semicircle at an elevated frequency typically denotes the resistance in the charge transfer (Rce) at the electrolyte/Pt interface. In contrast, the subsequent semicircle at the mid-frequency region relates to the charge transfer resistance ($R_{ct}$) inside the electrolyte/N719 dye/photoanode interface. The ohmic resistance resulting from the contacts between the electrodes and the FTO conductive surface is represented by the series resistance (Rs). The minimal Rs values indicate that the photoanode and FTO surfaces exhibit excellent electrical connections. The equivalent circuit model (as shown in the inset FIG. 11A) was used to calculate the Rs, Rce. and Rct values in conjunction with the electron lifetime tabulated in Table 2.

TABLE 2

Series, charge transfer resistance, and calculated electron recombination lifetimes of charge carriers using various photoanodes for the fabricated devices.

| Fabricated DSSCs with various photoanodes | Rs (Ω) | Rce (Ω) | $R_{ct}$ (Ω) | $\tau_e$ (ms) |
|---|---|---|---|---|
| $TiO_2$ photoanode | 13.70 | 12.6 | 21.70 | 3.2 |
| $TiO_2$/GCN photoanode | 12.28 | 11.06 | 19.91 | 4.1 |
| $TiO_2$/GCN/CdSe photoanode | 12.18 | 7.9 | 14.97 | 5.3 |

Figure 11B:
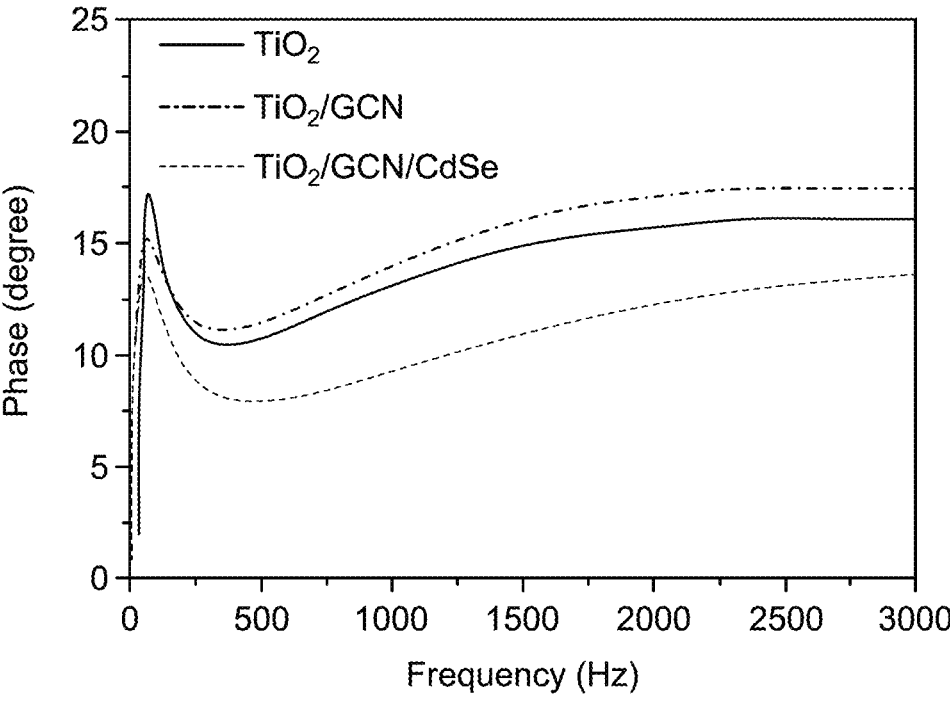
FIG. 11B shows a Bode phase plot of the $TiO_2$, $TiO_2$/GCN nanocomposite, and the $TiO_2$/GCN/CdSe nanocomposite, according to certain embodiments.

Notably, the resistance ($R_{ct}$=14.97 (2) is decreased in $TiO_2$/GCN/CdSe t-NCs photoanode, leading to high charge transport across the photoanode and electrolyte interface and high $J_{SC}$. This could be due to the strong N719 dye adsorption, enhanced visible light spectrum, and co-sensitization of N719 dye due to CdSe anchoring on to $TiO_2$/GCN sheets, leading to more charge injection in $TiO_2$/GCN/CdSe t-NCs photoanode as compared to $TiO_2$/GCN b-NCs ($R_{ct}$=19.91Ω) and pure $TiO_2$ ($R_{ct}$=21.70Ω) based photoanodes. The findings demonstrate that anchoring CdSe onto $TiO_2$/GCN sheets and the synergistic effect of CdSe and N719 enhance electron transport by reducing total internal resistance and increasing overall device efficiency. Furthermore, the associated Bode plot is illustrated in FIG. 11B, from which the adequate electron recombination lifetime was calculated using equation 2

$$\tau_e = \frac{1}{2\pi f_{max}} \qquad (2)$$

Where $\tau_e$ is the electron recombination lifetime, fmax denotes the value of the medium frequency peak of the Bode curve. An extended electron recombination duration signifies a more prolonged recombination process. The data in Table 2 indicate that $TiO_2$/GCN/CdSe t-NCs photoanode shows a higher the of 5.3 ms than $TiO_2$/GCN b-NCs ($\tau_e$=4.1 ms) and $TiO_2$ NPs ($\tau_e$=3.2 ms) based photoanodes. The augmentation of electron lifetime in t-NCs-based photoanode is likely ascribed to the anchoring of CdSe onto $TiO_2$/GCN sheets, which enhances electron transfer because of the co-sensitization of N719 dye and diminishes the likelihood of recombination between the injected electrons and $I_3$ in the electrolyte, resulting in improved $J_{SC}$ and overall device PCE.

Figure 12:
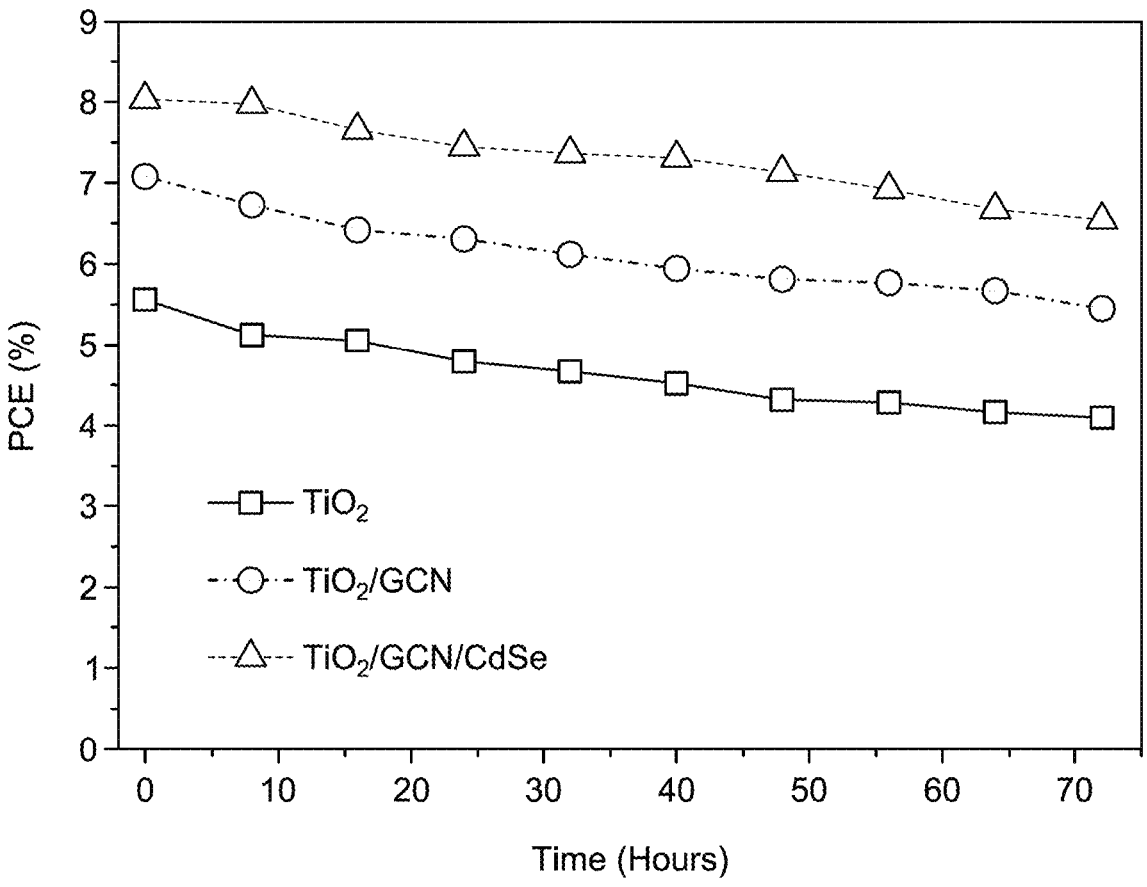
FIG. 12 shows a power conversion efficiency (PCE) degradation curve of DSSC devices with the $TiO_2$, $TiO_2$/GCN nanocomposite, and the $TiO_2$/GCN/CdSe nanocomposite used as photoanodes under the light illumination (under 100 mW cm$^{-2}$ AM 1.5 G irradiation) for 72 hours at an interval of 8 hours, according to certain embodiments.

The device photostability was studied under continuous light illumination and ambient environment (100 mW $cm^{-2}$ AM 1.5 G irradiation) for 72 hours (hrs) at intervals of 8 hours to understand the device degradation of the fabricated DSSC with various photoanodes. The degradation curve is presented in FIG. 12. A gradual decrease in the efficiency of fabricated DSSC with $TiO_2$ photoanode was observed, resulting in a degradation of ~26.25% (PCE=4.10%) of its initial PCE of 5.56% under 72 hours of light illumination. The DSSC fabricated with $TiO_2$/GCN b-NCs photoanode demonstrates better photostability of ~76.98% than $TiO_2$ (~73.75%) due to the improved charge separation, reduced recombination, and enhanced lifetime of charge carriers. Furthermore, DSSCs fabricated with $TiO_2$/GCN/CdSe t-NCs photoanode displayed superior photostability of 81.35% and slow degradation of PCE from 8.04% to 6.54% compared to b-NCs and $TiO_2$-based photoanodes. This could be due to the synergistic interaction with GCN and CdSe, promoting charge separation and visible light absorption, leading to stabilized charge carrier dynamics at the electrolyte interface and $TiO_2$ GCN/CdSe t-NCs-based photoanode interface.

$TiO_2$/GCN b-NCs and $TiO_2$/GCN/CdSe t-NCs were synthesized using the PLAL method and were characterized employing various techniques. It was demonstrated that the overall absorption spectrum of $TiO_2$ was enhanced at a higher wavelength due to the introduction of GCN, which led to the enhancement in visible light absorption for $TiO_2$/GCN b-NCs.

Additionally, the absorption spectrum for $TiO_2$/GCN/CdSe t-NCs is also enhanced more at the higher wavelengths due to the anchoring of CdSe onto $TiO_2$/GCN, which signifies reduced optical band gap energy (Eg=2.56 eV) of $TiO_2$/GCN/CdSe t-NCs. Moreover, the charge recombination efficiency of the binary and t-NCs was analyzed, and it was found that t-NCs show more PL quenching than $TiO_2$/GCN b-NCs and $TiO_2$ NPs, leading to faster charge transport and slower recombination and hence increasing the DSSC device performance. The DSSC device fabricated with t-NCs photoanode shows a high PCE of 8.04% and $J_{SC}$ of 20.56 mA/cm$^2$ due to the extended visible light absorption leading to enhanced charge injection and transport compared to b-NCs and TiO$_2$ NPs-based photoanodes. Furthermore, a reduced charge transfer resistance R$_{ct}$=14.97Ω with TiO$_2$/GCN/CdSe t-NCs photoanode as compared to b-NCs (R$_{ct}$=19.91Ω) and TiO$_2$ (R$_{ct}$=21.70Ω) based photoanodes were showing high charge transport across the photoanode and electrolyte interface, thereby reducing the overall recombination in the device and improving the lifetime of charge carriers. Moreover, DSSC fabricated with TiO$_2$/GCN/CdSe t-NCs photoanode displayed superior photostability of 81.35% and slow degradation of PCE from 8.04% to 6.54% compared to b-NCs and TiO$_2$-based photoanodes. Despite demonstrating exceptional efficiency and photostability, TiO$_2$/GCN/CdSe t-NCs-based photoanodes present an opportunity for future work to elucidate the charge transfer mechanisms and diffusion processes influenced by altering the compositions of GCN and CdSe in fabricated DSSCs.

Numerous modifications and variations of the present disclosure are possible in light of the above teachings. It is therefore to be understood that within the scope of the appended claims, the invention may be practiced otherwise than as specifically described herein.

The invention claimed is:

1. A dye-sensitized solar cell (DSSC), comprising:
a photoanode comprising a layer of a titanium dioxide, graphitic carbon nitride, and cadmium selenide (TiO$_2$/GCN/CdSe) nanocomposite, a layer of a light absorbing dye and a transparent glass substrate on which the TiO$_2$/GCN/CdSe nanocomposite layer and the light absorbing dye layer are coated,
a counter electrode comprising a layer of electrically conductive material and a transparent glass substrate, wherein the electrically conductive material is coated on the transparent glass substrate and
an electrolyte between the photoanode and the counter electrode,
wherein the TiO$_2$/GCN/CdSe nanocomposite comprises TiO$_2$ in an amount of 75 to 95 percent by weight (wt. %), GCN in an amount of 5 to 10 wt. %, and CdSe in an amount of 2 to 7 wt. %, based on the total weight of the TiO$_2$/GCN/CdSe nanocomposite.

2. The dye sensitized solar cell of claim 1, wherein the light absorbing dye has an absorbance maximum at a wavelength of 200 to 1000 nm.

3. The dye sensitized solar cell of claim 1, wherein the light absorbing dye is selected from the group consisting of N3, N719, coumarin, a porphyrin, an indoline dye, chlorophyll, anthocyanin, betalain, a carotenoid, a tannin, and an aurone.

4. The dye sensitized solar cell of claim 1, wherein the electrically conductive material on the counter electrode is selected from the group consisting of platinum, gold, silver, graphite, iridium oxide, and ruthenium oxide.

5. The dye sensitized solar cell of claim 1, wherein the electrolyte is an iodide/triiodide-based electrolyte.

6. The dye sensitized solar cell of claim 1, wherein the electrolyte is either a solution-state electrolyte or a solid-state electrolyte.

7. The dye sensitized solar cell of claim 1, wherein the TiO$_2$/GCN/CdSe nanocomposite is in the form of particles, having a polycrystalline structure.

8. The dye sensitized solar cell of claim 1, wherein the TiO$_2$/GCN/CdSe nanocomposite has a band gap of 2.3 to 2.8 eV.

9. The dye sensitized solar cell of claim 1, wherein the photoanode has a conversion efficiency of 7 to 9%.

10. The dye sensitized solar cell of claim 1, wherein the photoanode has a short circuit current density ($J_{SC}$) of 15 to 25 mA/cm$^2$.

11. The dye sensitized solar cell of claim 1, wherein the photoanode has an open circuit voltage ($V_{OC}$) of 0.5 to 0.8 V.

12. The dye sensitized solar cell of claim 1, wherein the photoanode has a charge transfer resistance (R$_{ct}$) of 12 to 17Ω.

13. The dye sensitized solar cell of claim 1, wherein the TiO$_2$/GCN/CdSe nanocomposite is obtained by:
mixing TiO$_2$, GCN and CdSe in a solvent to generate a solution; and
exposing the solution to a concentrated laser beam to obtain the TiO$_2$/GCN/CdSe nanocomposite.

14. The dye sensitized solar cell of claim 13, wherein the mixing has a TiO$_2$:GCN:CdSe weight ratio of 0.8 to 1.2:0.05 to 0.2:0.01 to 0.1.

15. The dye sensitized solar cell of claim 13, wherein the solvent is selected from the group consisting of water, dimethyl formamide, dimethyl sulfoxide, methanol, ethanol, propanol, isopropanol, and butanol.

16. The dye sensitized solar cell of claim 13, wherein the concentrated laser beam has a wavelength of 500 to 600 nm, a pulse energy of 35 to 45 mJ cm$^{-2}$, a pulse width of 1 to 10 ns, and repeat rate of 5 to 15 Hz.

17. The dye sensitized solar cell of claim 1, wherein the photoanode is produced by:
applying Ti-Nanoxide BL/SP to a glass substrate to generate a TiO$_2$ layer;
mixing the TiO$_2$/GCN/CdSe nanocomposite with α-terpinol, ethanol, and ethyl cellulose to form a gel;
spreading the gel on the TiO$_2$ layer to obtain an anode;
submerging the anode in a dye solution to obtain the photoanode.

18. The dye sensitized solar cell of claim 17, wherein the anode is heated twice after spreading, and wherein a first heating is to a temperature of 150 to 250° C., and wherein a second heating is to a temperature of 450 to 600° C.

19. The dye sensitized solar cell of claim 17, wherein the submerging is lasted for a period of 18 to 48 hours.

* * * * *